(12) United States Patent
Gutman et al.

(10) Patent No.: US 12,311,302 B2
(45) Date of Patent: May 27, 2025

(54) ENLARGED OPENING FILTER BAGS, SUPPORT ASSEMBLIES, AND FILTER BAG ASSEMBLIES

(71) Applicant: Donaldson Company, Inc., Bloomington, MN (US)

(72) Inventors: David V. Gutman, Brussels (BE); Massimo Movia, Tervuren (BE); Eric W. E. Collin, Bilzen (BE); Steven A. Johnson, Williams, MN (US); Benny J. B. Mombaerts, Boortmeerbeek (BE); Gabriel J. Safarian, Deephaven, MN (US); David L. Van Eylen, Heverlee (BE); Iman Vezvaei, Brussels (BE)

(73) Assignee: Donaldson Company, Inc., Bloomington, MN (US)

( * ) Notice: Subject to any disclaimer, the term of this patent is extended or adjusted under 35 U.S.C. 154(b) by 555 days.

(21) Appl. No.: 17/694,481

(22) Filed: Mar. 14, 2022

(65) Prior Publication Data
US 2022/0297041 A1    Sep. 22, 2022

Related U.S. Application Data

(60) Provisional application No. 63/161,604, filed on Mar. 16, 2021.

(51) Int. Cl.
*B01D 53/02*    (2006.01)
*B01D 46/00*    (2022.01)
(Continued)

(52) U.S. Cl.
CPC ......... *B01D 46/0005* (2013.01); *B01D 46/02* (2013.01); *B01D 46/2403* (2013.01); *B01D 2201/0415* (2013.01); *B01D 2201/34* (2013.01)

(58) Field of Classification Search
CPC ........ B01D 2201/0415; B01D 2201/34; B01D 2275/206; B01D 2275/207; B01D 46/0005; B01D 46/02; B01D 46/2403; B01D 46/71
See application file for complete search history.

(56) References Cited

U.S. PATENT DOCUMENTS

| 3,942,962 A | 3/1976 | Duyckinck |
| 4,218,227 A | 8/1980 | Frey |
| (Continued) | | |

FOREIGN PATENT DOCUMENTS

| CN | 206325319 U | 7/2017 |
| CN | 210586290 U | 5/2020 |
| (Continued) | | |

OTHER PUBLICATIONS

Integrated AIR Filtration, "New BlueClean Filter Unit!," LinkedIn, May 17, 2023, https://www.linkedin.com/posts/integratedair-filtration_new-fp-ultra-insertable-activity-7048610106191556609-QiF3?utm_source=share&utm_medium=member_ios, 5 pages.
(Continued)

*Primary Examiner* — Christopher P Jones
(74) *Attorney, Agent, or Firm* — Mueting Raasch Group

(57) ABSTRACT

Filter bags, filter bag support assemblies, and filter bag assemblies are described herein. The filter bags, filter bag support assemblies, and filter bag assemblies may be used in air filter systems to remove particulate matter from air or other gases. Methods of using the air filter systems and methods of assembling the filter bag assemblies are also described.

20 Claims, 24 Drawing Sheets

(51) Int. Cl.
  *B01D 46/02* (2006.01)
  *B01D 46/24* (2006.01)

(56) References Cited

U.S. PATENT DOCUMENTS

| | | |
|---|---|---|
| 4,395,269 A | 7/1983 | Schuler |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 4,514,200 A * | 4/1985 | Sumerau ............... A47L 9/1427 55/374 |
| 4,661,131 A | 4/1987 | Howeth |
| 4,954,255 A | 9/1990 | Muller et al. |
| 5,207,812 A | 5/1993 | Tronto et al. |
| 5,211,846 A | 5/1993 | Kott et al. |
| 5,222,488 A | 6/1993 | Forsgren |
| 5,330,728 A * | 7/1994 | Foster ....................... F01N 3/28 422/177 |
| 5,562,746 A | 10/1996 | Raether |
| 5,730,766 A | 3/1998 | Clements |
| 6,090,173 A | 7/2000 | Johnson et al. |
| 6,902,592 B2 | 6/2005 | Green et al. |
| 7,641,708 B2 | 1/2010 | Kosmider et al. |
| 8,075,648 B2 | 12/2011 | Raether |
| 2006/0112667 A1 | 6/2006 | Sporre et al. |
| 2008/0115312 A1* | 5/2008 | DiPasquale ............... A47L 9/26 15/327.2 |
| 2021/0077934 A1 | 3/2021 | Johnson et al. |
| 2022/0297041 A1* | 9/2022 | Gutman .................. B01D 46/02 |
| 2022/0297046 A1 | 9/2022 | Collin et al. |
| 2023/0191303 A1 | 6/2023 | Graham et al. |

FOREIGN PATENT DOCUMENTS

| | | |
|---|---|---|
| DE | 821596 C | 11/1951 |
| DE | 202020105243 U1 | 12/2020 |
| GB | 257711 A | 9/1926 |
| GB | 858471 A | 1/1961 |
| WO | 2021050817 A1 | 3/2021 |
| WO | 2022197631 A1 | 9/2022 |
| WO | 2022197632 A1 | 9/2022 |
| WO | 2023122106 A1 | 6/2023 |

OTHER PUBLICATIONS

International Preliminary Report on Patentability in PCT/US2022/020242, mailed Sep. 12, 2023, 9 pages.

International Search Report and Written Opinion in PCT/US2022/020242, mailed May 10, 2022, 12 pages.

* cited by examiner

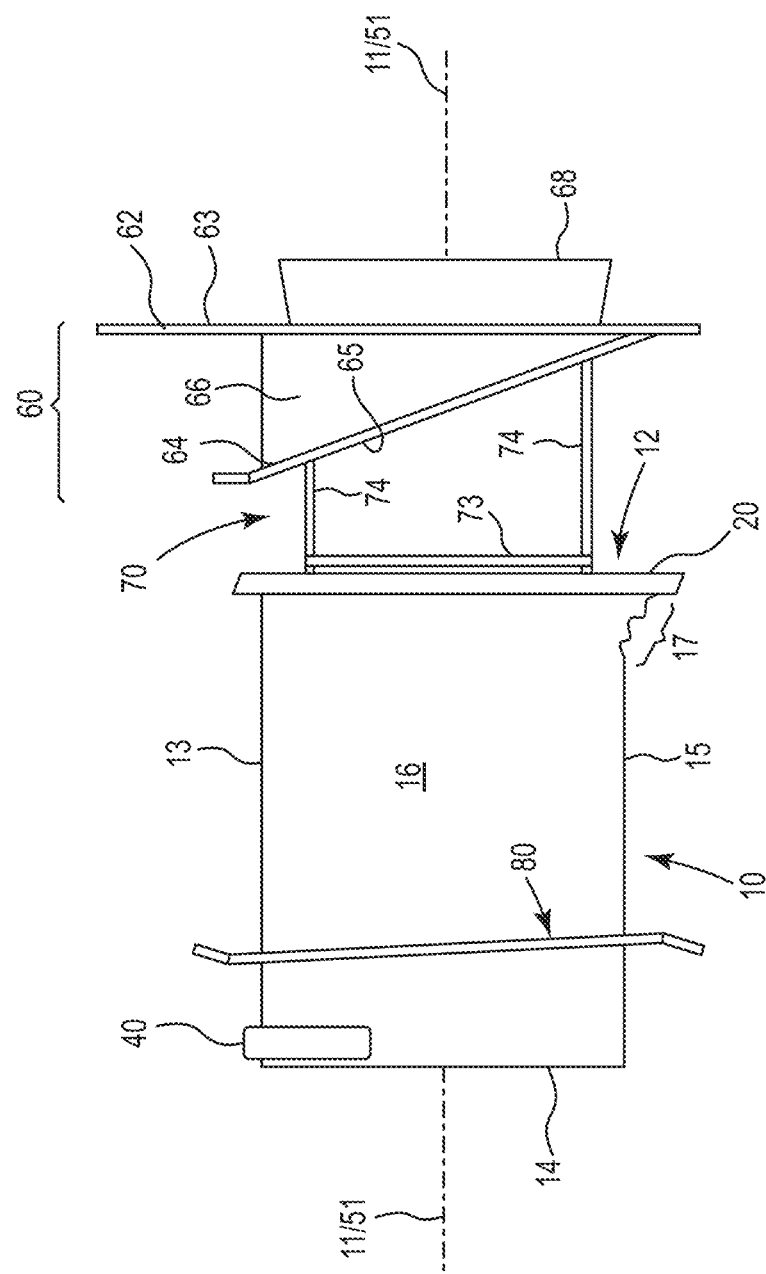

ENLARGED OPENING FILTER BAGS, SUPPORT ASSEMBLIES, AND FILTER BAG ASSEMBLIES

RELATED APPLICATION

This application claims the benefit under 35 U.S.C. Section 119 of U.S. Provisional Application No. 63/161,604, filed Mar. 16, 2021, the disclosure of which is incorporated by reference herein in its entirety.

Filter bags, filter bag support assemblies, filter bag assemblies, and filter systems, as well as corresponding methods, are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Some systems for cleaning an air or other gas streams laden with particulate matter include filter bags (sometimes referred to as socks) located in a housing. The filter bags are typically constructed of filter media, for example, fabric, pleated paper, etc. The gas stream contaminated with particulate matter is typically passed through the housing so that the particulate matter is captured and retained by one or more filter bags.

Air filter systems typically include a clean air chamber and a dirty air chamber. The two chambers are separated by a structure that is commonly referred to as a tubesheet. The tubesheet has a number of openings so that air can pass between the clean and dirty air chambers. The filter bags are positioned over the openings so that particulate-laden air (dirty air) introduced into the dirty air chamber must pass through a filter bag to move into the clean air chamber. The particulate matter in the dirty air collects on the filter bags as the air moves through the filter bags.

From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter bags capture particulate matter, flow through the system is inhibited and periodic cleaning of the filter bags can be performed to increase air flow through the system. Cleaning can be accomplished by periodically pulsing a brief jet of pressurized air into the interior of the filter bag to reverse the air flow through the filter bag, causing the collected particulate matter to be driven off of the filter bag. The pressurized air may be directed into pulse collectors as described in, for example, U.S. Pat. No. 3,942,962 (Duyckinck), U.S. Pat. No. 4,218,227 (Frey), U.S. Pat. No. 6,090,173 (Johnson et al.), U.S. Pat. Nos. 4,395,269, 6,902,592 (Green et al.), U.S. Pat. No. 7,641,708 (Kosmider et al.), and US Patent Application Publication US 2006/0112667 A1.

SUMMARY

Filter bags, filter bag support assemblies, and filter bag assemblies are described herein. The filter bags, filter bag support assemblies, and filter bag assemblies may be used in air filter systems to remove particulate matter from air or other gases. Methods of using the air filter systems and methods of assembling the filter bag assemblies are also described.

In one or more embodiments, the filter bags described herein have a closed end and a bag opening end spaced apart from each other along a bag axis. A sealing cuff extends around a perimeter of the bag opening, and a reference bag length measured along the bag axis between the sealing cuff and a reference plane oriented perpendicular to the bag axis between the closed end and the bag opening changes when moving around the perimeter of the bag opening. Filter bags having a changing reference bag length as described herein have, as compared to conventional filter bags, an enlarged bag opening.

The enlarged bag openings of filter bags described herein may, in one or more embodiments, alternatively be characterized based on the length of the perimeter of the bag opening as compared to the length of the perimeter of the tubular body located between the bag opening and the closed end of the filter bag. The length of the perimeter of tubular body may be measured in the reference plane used to determine the reference bag length or any other plane (perpendicular to the bag axis) located between the closed end and the bag opening.

When filter bags with enlarged bag openings as described herein are advanced onto the cage of a filter bag support assembly as described herein, the enlarged bag openings provide advantages as compared to filter bags having smaller conventional bag openings.

One advantage of filter bags having enlarged bag openings over conventional filter bags is that the, as the enlarged bag opening is advanced over the cage of a flange assembly, the enlarged bag opening provides extra clearance between the bag opening and the cage (as compared to the smaller size of the tubular body between the bag opening and the closed end of the filter bag). The extra clearance at the enlarged bag opening can, for example, reduce friction between the bag opening and the cage as the bag opening is advanced over at least a portion of the cage. That reduced friction results in a corresponding decrease in the force required to advance the filter bag over the cage.

Although the entire filter bag could be enlarged to make installing the filter bag on a cage easier, an enlarged filter bag would result in filter bags that do not fit as tightly on the cages of bag support assemblies as described herein. That looser fit would be expected to decrease pulse cleaning performance and/or filter bag life.

In particular, pulse cleaning of the filter bags on bag support assemblies in filter systems as described herein can be improved by fitting the filter bags tightly on the cages of the bag support assemblies. The increased tautness of the tighter fitted filter media results in increases in the rapid acceleration associated with pulse cleaning of the filter bags (sometimes referred to as "bag snap"). The increased rapid outward acceleration may result in increased dislodgment of particulate matter collected on the filter bags, with the dislodged particulate matter falling into a hopper of the filter system under the force of gravity.

In addition to improving pulse cleaning performance, tighter fitting filter bag/cage combinations may also improve filter bag life by reducing filter bag wear caused by excessive movement between cages and looser fitting filter bags during pulse cleaning.

Yet another advantage that may be attributed to tighter fitting filter bag/cage combinations is that spacing between adjacent filter bags in the dirty air chamber of an air filter system may be reduced without causing corresponding reductions in pulse cleaning performance. That tighter spacing between adjacent filter bags can result in a corresponding reduction in the size of the air filter system as a whole. Smaller air filter systems that provide the same (or better) filtering capacity as larger air filter systems can be an important factor when available space in a facility is limited.

Still another advantage of filter bags having enlarged bag openings is that the proper orientation of the filter bags on the cages of flange assemblies can, in one or more embodiments, be guaranteed in those embodiments in which the filter bags are capable of being properly installed on the flange assemblies in only one orientation. Proper orientation of the filter bags on the filter bag support assemblies may be advantageous when, for example, the filter bags include a bag support feature proximate the closed end of the filter bags. In such embodiments, placement of the bag support feature on the top of the filter bag when mounted on a bag support assembly can be guaranteed because the filter bag will not fit properly on the bag support assembly when the bag support feature is on the bottom of the filter bag as mounted on the bag support assembly.

The filter bags, filter bag support assemblies, and filter bag assemblies described herein may be particularly useful in filter systems designed for use in industrial air filter applications in which particulate matter must be removed from relatively large volumes of dirty air. As such, the filter bags and filter bag assemblies must be sized to handle those air volumes and the particulate matter associated with the volumes. Generally, the filter bags described herein may have a bag length measured from the bag opening to the closed end of the bag that is 0.3 meters or more, 0.5 meters or more, or even 1 meter or more. The associated bag height (measured transverse to the length of the bag) may be 0.2 meters or more, 0.3. meters or more, 0.4 meters or more, or 0.5 meters or more.

In one or more embodiments, the filter bag assemblies include a flange assembly, a cage attached to the flange assembly, and a filter bag installed over the cage with an opening at the flange assembly. When installed in the dirty air chamber of a filter system, a seal between the flange assembly and the tubesheet defining the dirty air chamber is provided by applying a seal force on the end of the filter bag assembly located proximate the access panel on the side of the dirty air chamber opposite the tubesheet. That seal force is transmitted to the flange assembly through the cage.

Providing the seal force at the end of the filter bag assembly and transmitting that force through the cage to the flange assembly allows for removal and replacement of the filter bags (and the filter bag assemblies) through access ports on an access panel located across the dirty air chamber. As a result, the used filter bags (and the particulate matter collected on them) do not pass through, and potentially contaminate, the clean air chamber of the filter system.

Another potential advantage of providing and transmitting a seal force at the end of the filter bag assembly and transmitting that force through the cage to the flange assembly is that other components such as, for example, pulse generators, etc. need not be removed or even partially disassembled to accommodate removal and replacement of filter bags.

In one or more embodiments of the filter systems described herein, the filter bags are supported in a dirty air chamber such that the filter bags and their supporting assemblies (for example, flange assemblies, cages, etc.) can be removed and replaced without passing through the clean air chamber of the filter system. That limits or prevents contamination of the clean air chamber by particulate matter dislodged during removal of used filter bags that is associated with removal of used filter bags through the clean air chamber.

Filter systems that include one or more of the various features and components described herein may offer one or more advantages such as, for example, improved energy efficiency, reduced noise generation, etc. by, in one or more embodiments, reduced pressure drops within the filter systems both during primary flow operation and pulse cleaning of the filter elements (where primary flow operation occurs when the filter system is removing particulate matter from a dirty air stream), reducing frictional losses in the filter systems (both during primary flow operation and pulse cleaning of the filter bags, improving particulate loading characteristics (thus potentially requiring fewer cleaning pulses), etc.

These advantages may, in one or more embodiments be synergistic, i.e., the energy efficiency, reduced noise, etc. may be improved by using two or more of the features and/or components together in the same filter systems.

In a first aspect, one or more embodiments of a filter bag as described herein comprises a tubular body formed of filter media configured to remove particulate matter from air passing through the filter media, the tubular body extending from a closed end to a bag opening along a bag axis coincident with a central axis of the tubular body, wherein a sealing cuff extends around a perimeter of the bag opening, and wherein a reference bag length measured along the bag axis between a reference plane oriented perpendicular to the bag axis and the bag opening changes when moving around the perimeter of the bag opening.

In a second aspect, one or more embodiments of a filter bag support assembly as described herein comprises: a flange assembly comprising an interior face and a tubesheet face, the flange assembly comprising a clean air outlet extending through the flange assembly; and a cage comprising a first cage end attached to the flange assembly, the cage extending away from the interior face of the flange assembly over a cage length to a second cage end distal from the base, the cage defining a cage axis extending between the first cage end and the second cage end; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture, the bag seal surface facing the clamp, wherein the clamp comprises a clamp seal surface surrounding the clamp aperture, the clamp seal surface facing the bag seal surface when the clamp is attached to the base, and wherein the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

In a third aspect, one or more embodiments of a filter bag support assembly as described herein comprises: a flange assembly comprising an interior face and a tubesheet face, the flange assembly comprising a clean air outlet extending through the flange assembly; and a cage comprising a first cage end attached to the flange assembly, the cage extending away from the interior face of the flange assembly over a cage length to a second cage end distal from the base, the cage defining a cage axis extending between the first cage end and the second cage end; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture, the bag seal surface facing the clamp, wherein the clamp comprises a clamp seal surface surrounding the clamp aperture, the clamp seal surface facing the bag seal surface when the clamp is attached to the base, wherein, when the clamp is attached to the base, the bag seal surface and the clamp seal surface define a bag seal plane, wherein the cage axis is not normal to the bag seal plane.

In a fourth aspect, one or more embodiments of a filter bag assembly as described herein comprises: a flange assembly comprising an interior face and a tubesheet face, the flange assembly comprising a clean air outlet extending through the flange assembly; a cage comprising a first cage end attached to the flange assembly, the cage extending away from the interior face of the flange assembly over a cage length to a second cage end distal from the base, the cage defining a cage axis extending between the first cage end and the second cage end; and a filter bag comprising a tubular body formed of filter media configured to remove particulate matter from air passing through the filter media, the tubular body extending from a closed end to a bag opening along a bag axis coincident with a central axis of the tubular body, wherein the cage is contained within the tubular body of the filter bag, wherein a sealing cuff extends around a perimeter of the bag opening; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture and the clamp comprises a clamp seal surface surrounding the clamp aperture, wherein the sealing cuff is located between the bag seal surface and that clamp seal surface when the clamp is attached to the base, and wherein the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

In a fifth aspect, one or more embodiments of a filter bag as described herein comprises a tubular body formed of filter media configured to remove particulate matter from air passing through the filter media, the tubular body extending from a closed end to a bag opening along a bag axis coincident with a central axis of the tubular body, wherein a sealing cuff extends around a perimeter of the bag opening, and wherein a bag opening perimeter length measured around the perimeter of the bag opening is greater than a body perimeter length measured in a reference plane oriented perpendicular to the bag axis at a location between the bag opening and the closed end.

In a sixth aspect, one or more embodiments of an air filter system as described herein comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag as described herein, wherein the filter bag is located in the dirty air chamber.

In a seventh aspect, one or more embodiments of an air filter system as described herein comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag assembly as described herein, wherein the filter bag assembly is located in the dirty air chamber.

In an eighth aspect, one or more embodiments of a method of removing particulate matter from dirty air using an air filter system as described herein comprises delivering the dirty air to the dirty air chamber through the dirty air inlet and removing clean air from clean air chamber through the clean air outlet.

In a ninth aspect, one or more embodiments of a method of installing a filter bag on a filter bag support assembly to provide a filter bag assembly as described herein comprises: positioning the filter bag such that the filter bag opening is larger than a cage of the filter bag support assembly; advancing the filter bag opening over the cage towards a base of the filter bag support assembly; advancing a clamp of a flange assembly of the filter bag support assembly over the filter bag, wherein a tubular body of the filter bag extends through a clamp aperture in the clamp; and attaching the clamp to the base, wherein a sealing cuff on the filter bag forms a seal around the clamp aperture and a base aperture in the base such that air passing into or out of the filter bag must pass through the base aperture or the filter media forming the filter bag.

Use of any of the filter systems, filter bag assemblies, and filter bags described herein to remove particulate matter from dirty air (or any other gas) is also described herein.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the filter bags, filter bag support assemblies, filter bag assemblies, filter systems and methods described herein. Rather, a more complete understanding of the invention will become apparent and appreciated by reference to the following Description of Illustrative Embodiments and claims in view of the accompanying figures of the drawing.

BRIEF DESCRIPTIONS OF THE VIEWS OF THE DRAWING

FIG. 10 is a side elevation view of the filter bag support assembly of FIG. 7 (removed from the tubesheet) with one illustrative embodiment of a filter bag partially advanced over the cage extending from the base of the flange assembly.

DESCRIPTION OF ILLUSTRATIVE EMBODIMENTS

Figure 1:
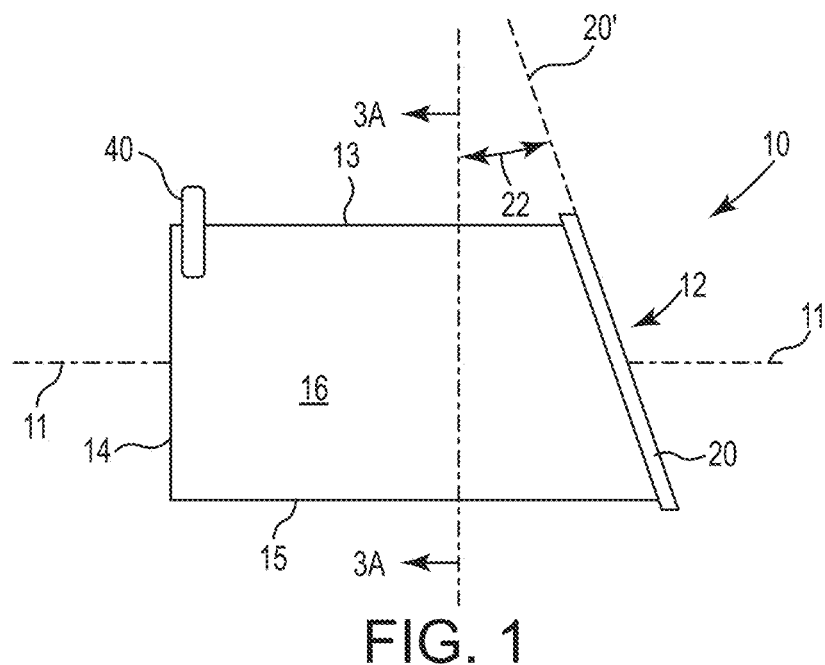
FIG. 1 is a side view of one illustrative embodiment of a filter bag having an enlarged bag opening as described herein.

In the following description of illustrative embodiments, reference is made to the accompanying figures of the drawing which form a part hereof, and in which are shown, by way of illustration, specific embodiments. It is to be understood that other embodiments may be used and structural changes may be made without departing from the scope of the present invention.

Figures 2, 3A:
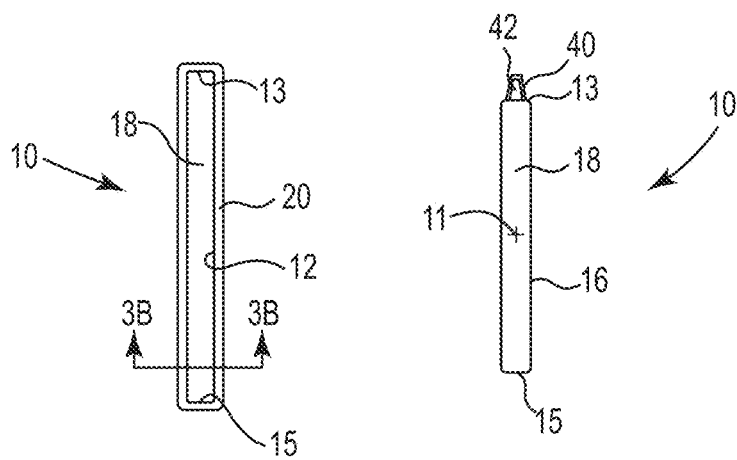
FIG. 2 is a view of the bag opening of the filter bag of FIG. 1 taken along viewing axis normal to the plane 20' in FIG. 1.
FIG. 3A is a cross-sectional view of the filter bag of FIG. 1 taken along line 3A-3A in FIG. 1.
Figure 3B:
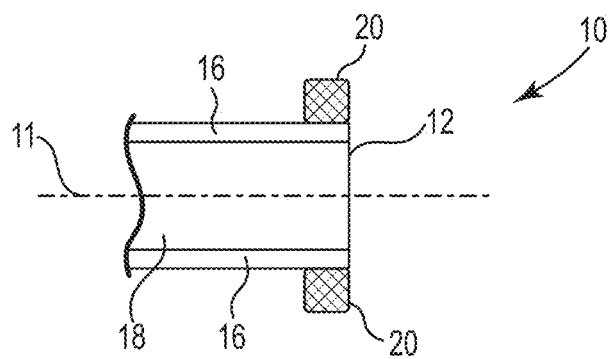
FIG. 3B is a cross-sectional view of the filter bag of FIG. 2 taken along line 3B-3B in FIG. 2.

FIGS. 1-3 depict various views of one illustrative embodiment of a filter bag as described herein. In FIG. 1, the filter bag 10 includes a bag opening 12 and a closed end 14. A body 16 extends from the bag opening 12 to the closed end 14 along a bag axis 11 extending between the bag opening 12 and the closed end 14.

The body 16 of the filter bag 10 can be described as a tubular body 16 extending between the bag opening 12 and the closed end 14. In a side elevation view such as that of FIG. 1, the filter bag 10 includes a top edge 13 extending from the bag opening 12/seal 20 to the closed end 14 and a bottom edge 15 extending from the bag opening 12/seal 20 to the closed end 14.

The tubular bodies of filter bags described herein may take many different forms including, for example, an envelope-like shape, a triangular shape in which the tubular body includes two major sides that meet along a top edge and a bottom side connecting the bottom edges of the two major sides, a rectangular shape (also having, e.g., two major sides), etc.

In one or more embodiments, the bag axis 11 may be described as being coincident with a central axis of the tubular body 16, where the central axis/bag axis 11 extends through center of the tubular body 16 such that the central axis/bag axis 11 contains the geometric centers of cross-sections of the tubular body 16 taken in planes oriented perpendicular to the central axis/bag axis 11. In the depicted illustrative embodiment, the filter bag 10 includes a tubular body 16 in which the top edge 13 and the bottom edge 15 are aligned with (e.g., parallel to) each other.

A reference plane 14' is also depicted in connection with illustrative filter bag 10 in FIG. 1. The reference plane 14' is oriented perpendicular to the bag axis 11. In the depicted embodiment, the reference plane 14' can also be described as being aligned with (e.g., parallel to) the closed end 14 of the filter bag 10 because, in the depicted embodiment, the closed end 14 is also oriented perpendicular to the bag axis 11.

The body 16 of the filter bag 10 is primarily constructed of filter media configured to filter air or any other gas passing through the filter media forming the body 16 with particulate matter entrained in the air or other gas being captured within or on the filter media forming the body 16. In general, the filter media may preferably be flexible enough such that the filter media is capable of being flexed during pulse cleaning as described herein with that flexing or movement of the filter media preferably resulting in removal of at least a portion of the particulate matter captured within or on the filter media forming the filter body 16. The construction of such filter media is well known to those skilled in the art and may, for example, include woven materials, nonwoven materials, paper, etc. selected in view of the particulate matter to be collected, airflow requirements, strength requirements, etc. Suitable filter bags may be constructed of one or more layers of filter media, scrim, etc. that includes one or more of polyester, polypropylene, aramid, polyester/polytetrafluoroethylene material in both woven and/or nonwoven constructions, etc.

In one or more embodiments, the filter bags described herein may be distinguished from filter cartridges based on their response to compression forces directed between the filter bag opening the closed end of the filter bag, i.e., the end of the bag located opposite the bag opening. In the absence of any extraneous support (such as, for example, the internal cages described herein as part of the filter bag support assemblies and filter bag assemblies), filter bags described herein would, in one or more embodiments, deform under a compressive force of 5 Newtons (approx. 1.1 pound-force) directed along a line extending through the bag opening to the closed end of the filter bag (for example, along the bag axis 11 depicted in FIG. 1). In addition to deforming, one or more embodiments of the filter bags used in the filter bag assemblies described herein, transmit essentially none of such a compressive force. A filter cartridge would, in contrast, not significantly deform and would transmit at least some, if not all, of such a compressive force. The flexibility that is the source of the inability of the filter bags used in the filter bag assemblies and filter systems described herein to transmit compressive forces is, however, at least in part the source of the filter bags' ability to rapidly accelerate (sometimes referred to as "snap") outward to remove particulate matter collected on the exterior of the filter media in response to a cleaning pulse.

With reference to FIGS. 1-3, the filter bag 10 depicted in FIG. 1 includes a sealing cuff 20 attached to the filter media forming the tubular shape of the body 16. In one or more embodiments of the filter bags described herein, the sealing cuff 20 may extend around the entire perimeter of the bag opening 12 as seen in, for example, FIG. 2.

In one or more embodiments, the sealing cuff 20 may be provided as a discrete component attached to the filter media forming the filter body 16 of the filter bag 10. The sealing cuff may, in one or more embodiments, be provided as multiple layers of filter media combined through one or more of stitching, adhesives, thermal welding, chemical welding, etc. The sealing cuff may include a polymeric component, e.g., a flexible polymeric component. In one or more embodiments, the sealing cuff may be capable of taking the shape of the body 16 of the filter bag 10. In one or more embodiments, the sealing cuff may be in the form of a compressible material, e.g., foam (closed cell, open cell, etc.), fabric, filter media, etc. to assist in forming a seal when clamped within a flange assembly of a filter system as described herein. In one or more embodiments, the sealing cuff may be formed of a resiliently compressible material capable of returning to its original shape (or nearly its original shape) after compression. In one or more other embodiments, the sealing cuffs may include one or more layers of material that exhibit increased resistance to abrasion and/or tearing. In yet other embodiments, the sealing cuffs use in filter bags as described herein may be formed of two or more components attached to the filter media through any suitable technique or combination of techniques.

Although the depicted illustrative embodiment of filter bag 10 includes a sealing cuff 20 positioned at the bag opening 12, in one or more embodiments, the sealing cuff could be positioned proximally from the bag opening 12 as defined by the filter media forming the tubular body 16. One advantage of providing a sealing cuff 20 located at the bag opening 12 is that compression of the sealing cuff 20 may be more readily obtained when such an arrangement of the sealing cuff 30 is provided. Compression of the sealing cuff 20 may be important in forming a proper seal to prevent unwanted passage of particulate matter when using filter bags as described herein.

One or more embodiments of filter bags having enlarged bag openings as described herein, such as depicted filter bag 10, may have enlarged bag openings that can be described as being not perpendicular to the bag axis 11. In a filter bag such as filter bag 10 in which the tubular body 16 terminates at a closed end 14 that, together with top edge 13 and bottom edge 15, form a generally rectangular tubular body 16 between the bag opening 12/sealing cuff 20 and the closed end 14, the reference plane 14' oriented perpendicular to the bag axis 11 may be aligned with (e.g., parallel to) the closed end 14 of the filter bag 10. In such embodiments, the bag opening 12/sealing cuff 20 can be described as not parallel to the reference plane 14' and/or the bag axis 11.

Although not required, the bag opening 12/sealing cuff 20 of illustrative filter bag 10 may define a bag opening plane 20', with the bag opening plane 20' being oriented at an angle (e.g., canted) with respect to reference plane 14'. The bag opening plane 20' can also be described with reference to the bag axis 11, i.e., the bag axis 11 is not normal to the bag opening plane 20' defined by the bag opening 12/sealing cuff 20 of filter bag 10.

The filter bag 10 with its canted or non-perpendicular bag opening 12 is one example of an enlarged bag opening on a filter bag as described herein. Regardless of the specific form of the enlarged bag opening, another manner in which the filter bags having enlarged bag openings as described herein can be characterized is based on a reference bag length as measured along the bag axis 11. In filter bags having enlarged bag openings as described herein, the reference bag length, e.g., the length (along the bag axis) between a reference plane and the bag opening (where the reference plane is oriented perpendicular to the bag axis) changes when moving around the perimeter of the bag opening. The reference planes used to characterize a filter bag in terms of reference bag length may be positioned at any location along the bag axis between the closed end and the bag opening. Any such reference plane should not intersect either the bag opening or the closed end of the filter bag.

With reference to FIG. 1, the reference bag length as measured along the bag axis 11 between the bag opening 12/sealing cuff 20 and the reference plane 14' along the top edge 13 of the filter bag 10 is shorter than the reference bag length along the bottom edge 15 of the filter bag 10. The reference bag length can further be described as changing when moving around the perimeter of the bag opening 12/sealing cuff 20. For example, when moving along the perimeter of the bag opening 12 from the top edge 13 to the bottom edge 15, the reference bag length (i.e., the distance between the reference plane 14' and the bag opening 12) increases. Conversely, when moving along the perimeter of the bag opening 12 from the bottom edge 15 towards the top edge 13, the reference bag length (i.e., the distance between the reference plane 14' and the bag opening 12) decreases.

In the filter bag 10, the reference bag length may be described as having a minimum bag length where the top edge 13 of the filter bag 10 meets the bag opening 12/sealing cuff 20 and a maximum reference bag length where the top edge 13 of the filter bag 10 meets the bag opening 12/sealing cuff 20. In embodiments in which the bag opening 12/sealing cuff define a bag opening plane 20', the rate of change in the reference bag length when moving between top edge 13 and the bottom edge 15 can be described as being substantially linear. In addition, the distance between the location at which the top edge 13 meets the bag opening 12/sealing cuff 20 and the location at which the bottom edge 15 meets the bag opening 12/sealing cuff 20 are equal whether moving around the perimeter of the bag opening 12 clockwise or counterclockwise.

As described herein, one advantage of a filter bag such as filter bag 10 having a canted bag opening is that the size of the of the bag opening 12/sealing cuff 20 as measured in bag opening plane 20' is greater than the cross-sectional size of the filter bag 10 as measured in, e.g., reference plane 14' that is perpendicular to the bag axis 11. The enlarged bag opening/sealing cuff 20 can make installing the filter bag on a cage of a flange assembly as described herein easier (as discussed in connection with, e.g., FIG. 5).

One way in which the size of the bag opening 12/sealing cuff 20 as measured in bag opening plane 20' and the cross-sectional size of the filter bag 10 in a perpendicular plane 14' can be compared is based on the angle 22 formed between the bag opening plane 20' containing the bag opening 12/sealing cuff 20 and a reference plane 14' that is perpendicular to the bag axis 11. In one or more embodiments, the angle 22 may be 15 degrees or more, 20 degrees or more, 25 degrees or more, 30 degrees or more, 35 degrees or more, 40 degrees or more, or 45 degrees or more. At an upper end, the angle 22 may be 60 degrees or less, 55 degrees or less, 50 degrees or less, 45 degrees or less, 40 degrees or less, 35 degrees or less, 30 degrees or less, 25 degrees or less, or 20 degrees or less.

Although increasing the size of the bag opening 12/sealing cuff 20 by increasing angle 22 can make installation of the filter bag 10 easier, increasing angle 22 does also increase the overall length of the filter bag 10 as measured along the bottom edge 15 of the filter bag 10. That increasing filter bag length would be expected to cause a corresponding increase in the size of a filter system in which filter bag 10 is installed. Because increases in the overall size of filter systems can be a concern, it may be preferred that the angle 22 be within a range of, for example, 15 degrees to 45 degrees, or, alternatively, 20 degrees to 40 degrees to provide a balance between easier installation and filter bag length while maintaining pulse cleaning performance and filter bag life.

Another way in which the size of the bag opening 12/sealing cuff 20 as measured in bag opening plane 20' and the cross-sectional size of the filter bag 10 in a reference plane 14' can be compared is based on the length of the perimeter of the bag opening 12/sealing cuff 20 as measured in bag opening plane 20' and the length of the perimeter of the filter bag 10 measured in the reference plane 14' located between the bag opening 12/sealing cuff 20. The difference in perimeter lengths is illustrated by FIGS. 2 and 3A, with the perimeter length of the bag opening 12 as seen in FIG. 2 being larger than the perimeter length of the tubular body 16 of the filter bag 10 as seen in FIG. 3A. In the depicted illustrative embodiment of FIG. 1, reference plane 14' could be located anywhere between the junction of the top edge 13 of the tubular body 16 and the closed end 14 of the filter bag 10 with no real change in the size of the perimeter of the filter bag 10.

Another optional feature of one or more embodiments of filter bags as described herein is the addition of a bag support connector 40 attached to the body 16 of the filter bag 10 proximate the closed end 14 of the body 16. The bag support 40 may preferably be located outside of the interior volume 13 of the body 16 of the filter back 10. In one or more embodiments, the bag support 40 may preferably include an aperture 42 configured to receive a hook or other structure configured to support the filter bag 10 at its closed end 14. In one or more embodiments, the bag support connector 40 may be as simple as a loop of material attached to opposite sides of the body 16 of the filter bag 10. Many variations are, of course possible as described elsewhere herein. For example, the bag support connector on the filter bag may be in the form of a hook while a chamber connector to which the hook attaches is in the form of a loop or aperture configured to receive the hook. In another alternative, a bag support may be in the form of a sling that may, for example wrap around the tubular body 16 of the filter bag 10.

Although the illustrative embodiment of filter bag 10 as depicted in FIGS. 1-3 is one example of a filter bag having an enlarged bag opening in which the bag opening 12/sealing cuff 20 is located in a plane 20', many alternative embodiments of filter bags having enlarged bag openings as compared to the size of the openings of the tubular bodies between the bag opening and the closed end of the filter bag. Only a few examples of the many potential filter bags are depicted in FIGS. 4-6.

Figure 4:
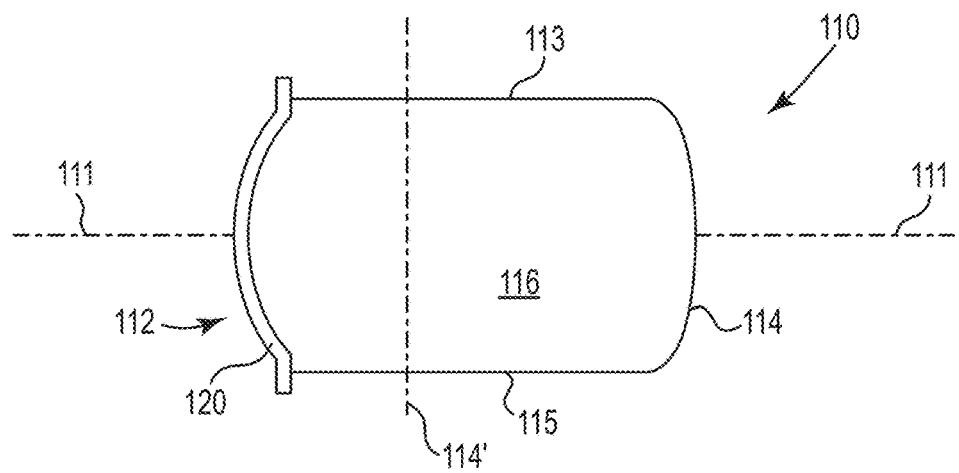
FIGS. 4-6 are side elevation views of some alternative illustrative embodiments of filter bags having enlarged bag openings as described herein.

In FIG. 4, filter bag 110 includes a bag opening 112/sealing cuff 120 and a closed end 114 located at opposite ends of a tubular body 116 along a bag axis 111. The bag opening 112/sealing cuff 120 have a rounded or arcuate shape over at least a portion of the bag opening 112/sealing cuff 120 that, when flattened, provides an enlarged bag opening having a longer perimeter length as compared to the perimeter length of the tubular body 116 as measured in a reference plane 114' oriented perpendicular to the bag axis 111 as described herein. In addition, the filter bag 110 provides another example of a filter bag in which the reference bag length measured between reference plane 114' and the bag opening 112 changes when moving around the perimeter of the bag opening 112 as described herein. In this illustrative embodiment, the reference plane 114' can be located at any location between the junctions of the bag opening 112/sealing cuff 120 with either the top edge 113 or bottom edge 115 of the filter bag 110 and the closed end 114. The depicted filter bag 110 also includes a closed end 114 that is not, itself, located in a plane, i.e., is rounded.

Figure 5:
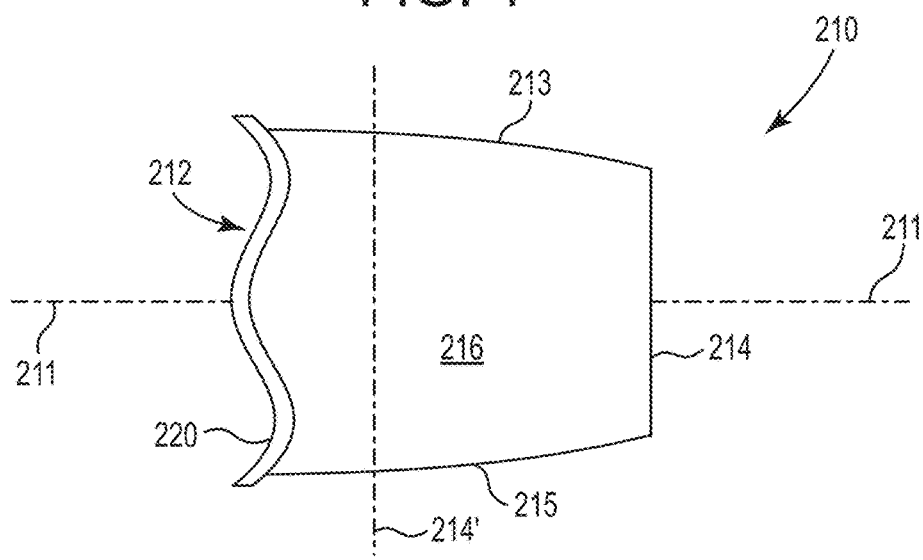

In FIG. 5, filter bag 210 includes a bag opening 212/sealing cuff 220 and a closed end 214 located at opposite ends of a tubular body 216 along a bag axis 211. The bag opening 212/sealing cuff 220 have a generally sinusoidal shape that, when flattened, provides an enlarged bag opening having a longer perimeter length as compared to the perimeter length of the tubular body 216 as measured in a reference plane 214' oriented perpendicular to the bag axis 211 as described herein. In addition, the filter bag 210 provides another example of a filter bag in which the reference bag length measured between reference plane 214' and the bag opening 212 changes when moving around the perimeter of the bag opening 212 as described herein. In this illustrative embodiment, the top edge 213 and the bottom edge 215 of depicted filter bag 210, unlike edges 13/15 of filter bag 10 or edges 113/115 of filter bag 110, are not aligned with the bag axis 211.

Figure 6:
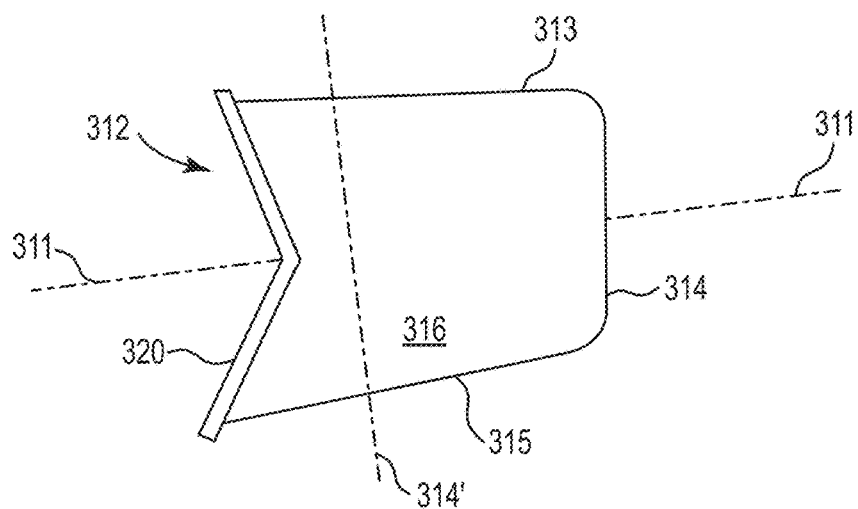

Filter bag 310 of FIG. 6 includes a bag opening 312/sealing cuff 320 and a closed end 314 located at opposite ends of a tubular body 316 along a bag axis 311. The bag opening 312/sealing cuff 320 have a V-shape that, when flattened, provides an enlarged bag opening having a longer perimeter length as compared to the perimeter length of the tubular body 316 as measured in a reference plane 314' oriented perpendicular to the bag axis 311 as described herein. In addition, the filter bag 310 provides another example of a filter bag in which the reference bag length measured between reference plane 314' and the bag opening 312 changes when moving around the perimeter of the bag opening 312 as described herein. In this illustrative embodiment, although bottom edge 315 of filter bag 310 is aligned with the bag axis 311, the top edge 313 is not aligned with the bag axis.

Filter Bag Support Assembly

The filter bag support assemblies described herein may be particularly well-suited for use with the filter bags described herein. With reference to FIGS. 7-11, one illustrative embodiment of a filter bag support assembly 50 is depicted, with the depicted filter bag support assembly 50 including a flange assembly that includes a base 60 and a clamp 80. A cage 70 is attached to the base 60 and extends away from the base 60 through the clamp 80 along a cage axis 51.

Figure 7:
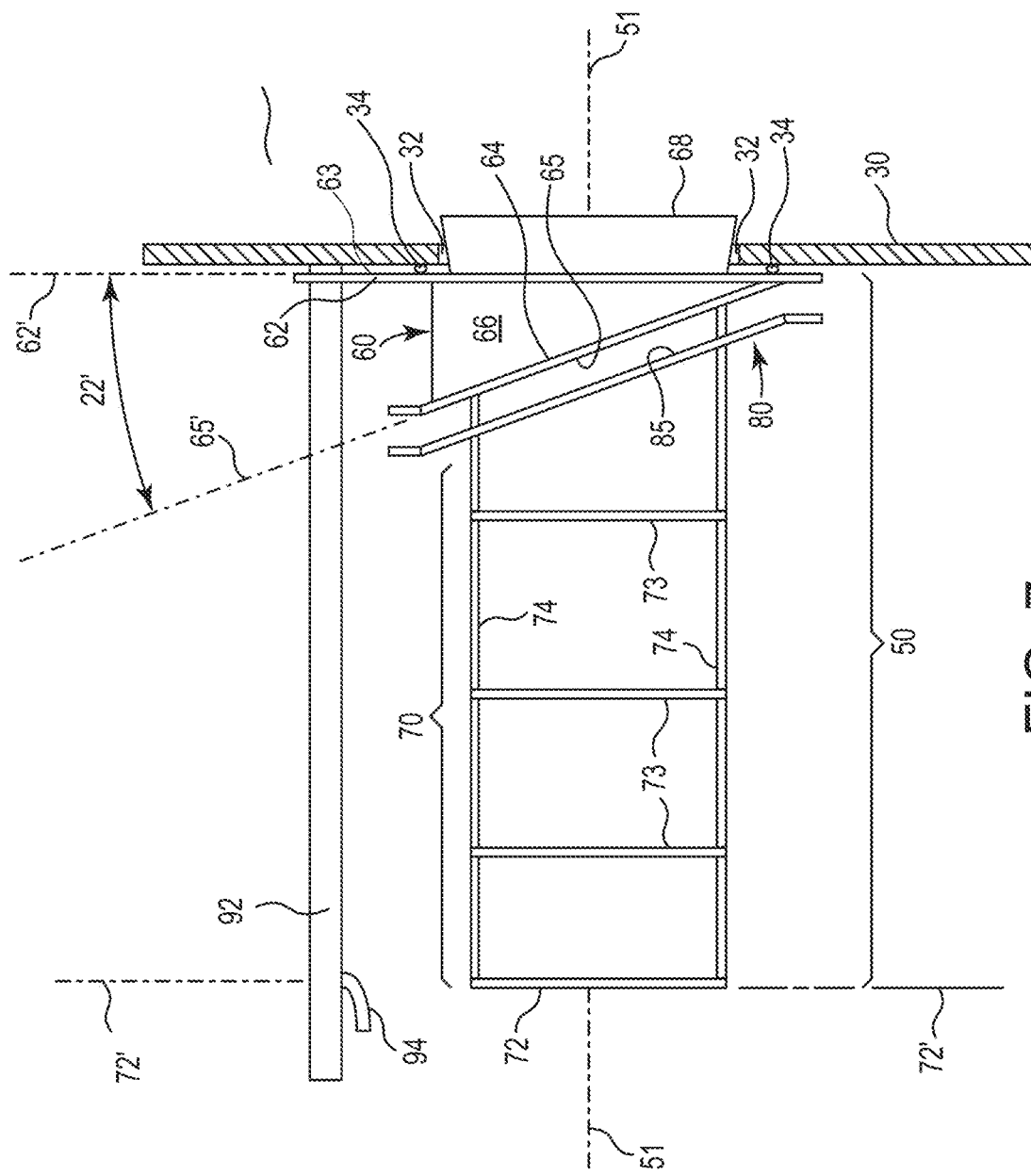
FIG. 7 is a side elevation view of one illustrative embodiment of a filter bag support assembly as described herein including a base having a cage extending therefrom and a clamp positioned for advancement on the cage, the filter bag support assembly mounted within a tubesheet aperture of tubesheet of an air filter system.
Figure 8:
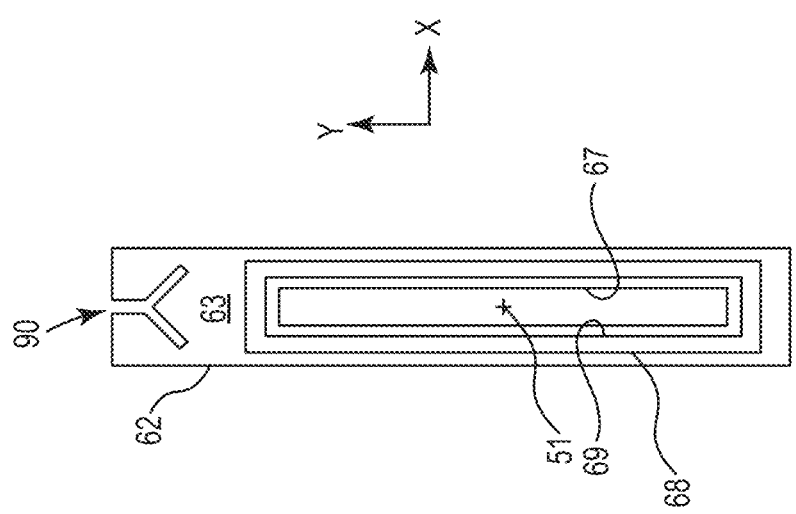
FIG. 8 is an end view of the base of the filter bag support assembly of FIG. 7 taken along the cage axis 51 as seen in FIG. 7.

With reference to FIGS. 7-8, in the depicted illustrative embodiment, the base 60 includes a tubesheet panel 62 and a bag seal panel 64 separated from the tubesheet panel 62 by a passageway 66. The bag seal panel 64 includes a bag seal surface 65 surrounding a base aperture 67 formed through the bag seal panel 64. Air passing through the base aperture 67 formed through the bag seal panel 64 moves through passageway 66 towards tubesheet panel 62, with tubesheet panel 62 including a tubesheet panel aperture 69 which allows air to pass through the tubesheet aperture 32 within pulse collector 68. In the depicted embodiment, tubesheet panel aperture 69 is formed at the base of the pulse collector 68. Although depicted as being located slightly inward from the tubesheet panel aperture 69, in one or more embodiments, the base aperture 67 may preferably be at least as large as the tubesheet panel aperture 69 (although that is not required).

The tubesheet panel 62 of the base 60 of the flange assembly includes a tubesheet face 63 that is, in one or more embodiments, configured to seal against a dirty air chamber side of a tubesheet 30 (see FIG. 7). In the depicted embodiment, a seal 34 is provided between the tubesheet face 63 of the tubesheet panel 62 and the tube sheet, with the seal 34 extending around the tubesheet aperture 32 in the tubesheet 30. The pulse collector 68 of the depicted flange assembly extends from the tubesheet panel 62 of the base 60 through the tubesheet aperture 32. The seal 34 prevents unwanted passage of air between the tubesheet 30 and the tubesheet face 63 of the tubesheet panel 62 of the base 60.

With reference to FIG. 7, the depicted illustrative embodiment of the bag support assembly also includes clamp 80 configured to act with the base 60 (in the depicted embodiment, against bag seal panel 64 of base 60) to capture the sealing cuff of a filter bag as described herein. In particular, the base 60 includes a bag seal surface 65 (on bag seal panel 64 in the depicted embodiment) and the base 80 includes a clamp seal surface 85 facing the bag seal surface 65. Together, the bag seal surfaced 65 on the base 60 and the clamp seal surface 85 on the clamp 80 are configured to form a seal with the sealing cuff of a filter bag mounted on the filter bag support assembly 50.

Figure 9:
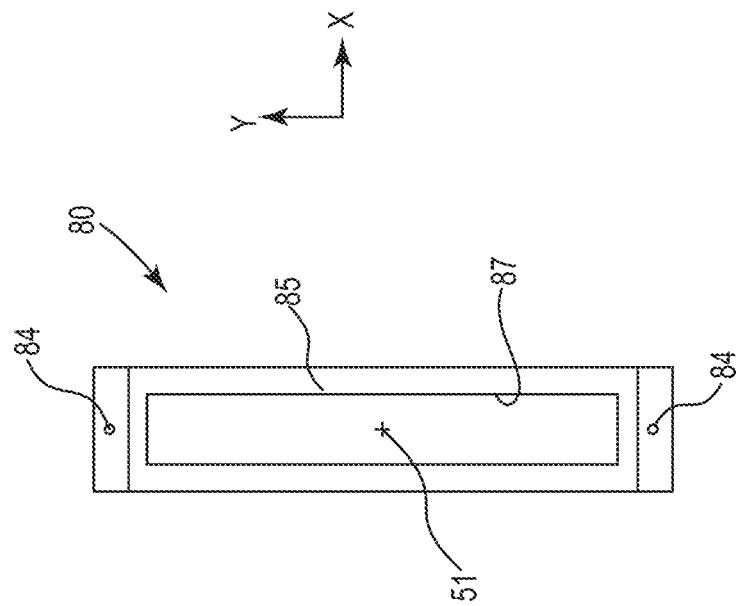
FIG. 9 is a view of the clamp of the filter bag support assembly of FIG. 7 removed from the cage, the view taken along the cage axis 51 as seen in FIG. 7.

The clamp 80 is depicted in FIG. 9 in a view taken along the cage axis 51 from the right side of the bag support assembly 50 as depicted in FIG. 7. In FIG. 9, the clamp seal surface 85 is depicted as surrounding a clamp aperture 87 formed through the clamp 80. When assembled with the base 60, the clamp aperture 87 is aligned with the base aperture 67 provided in bag seal panel 64 of base 62 allow air to pass through the clamp 80 into the base 60, with the air passing through the base 60 and tubesheet aperture 32 and tubesheet 30 as described herein.

In the depicted illustrative embodiment of base 60 of the flange assembly, the passageway 66 is constructed of one or more materials that are impermeable to air such that air passing between the base aperture 67 in the bag seal panel 64 and the tubesheet panel aperture 69 in the tubesheet panel 62 of base 60 cannot pass out of the passageway 66 between the tubesheet panel 62 and the bag seal panel 64.

The depicted embodiment of clamp 80 includes apertures 84 configured to receive fasteners (e.g., bolts, studs, etc.) that may be useful in securing the clamp 80 in position on base 62 form a seal with a sealing cuff of a filter bag as described herein. Many other structures and/or mechanisms for securing clamp 80 to base 60 could be used in place of such fasteners.

The flange assembly formed by the combination of the base 60 and clamp 80 can be described as defining a clean air outlet extending through the base 60 and the clamp 80 such that air (or any other gas) located within the interior volume of a filter bag installed on the filter bag support assembly passes into or out of the interior volume through the filter media of the filter bag or the clean air outlet. In particular, the clean air outlet in the depicted illustrative embodiment of filter bag support assembly 50 includes, moving from right to left in FIG. 7, a tubesheet panel aperture 69 formed into the tubesheet panel 62 of base 60, base aperture 67 formed in bag seal panel 64 of base 60, and clamp aperture 87 formed in clamp 80.

In the depicted illustrative embodiment of filter bag support assembly 50, a cage 70 is attached to the base 60, with the cage 70 extending away from the base 60 to support a filter bag as described herein. The cage 70 includes a first cage end attached to the base 60 of the flange assembly, with the cage 70 extending over a cage length to a second cage end 72 located distal from the base 60. The cage 70 defines a cage axis 51 extending between the first cage end attached to the base 60 and the second cage end 72 located distal from the base 60.

The depicted illustrative embodiment of cage 70 includes struts 74 extending away from the base 60 along the cage axis 51, with struts 74 terminating at second end 72 located distal from the base 60. The cage 70 as depicted in FIG. 7 also includes braces 73 extending between the struts 74 to provide additional support to a filter bag positioned on the cage 70. Although not required, the struts 74 the depicted embodiment are aligned with the cage axis 51. The depicted arrangements of struts 74 and braces 73 in cage 70 provide only one example of a cage that may be used to support a filter bag in connection with the filter bag support assemblies described herein.

Although the ends of struts 74 of cage 70 are depicted as terminating at the bag seal panel 64 of the base 60, in one or more embodiments, the struts 74 may be attached to the base 60 at any location between tubesheet panel 62 and bag seal panel 64. In those embodiments in which the struts 74 of cage 70 are attached to the bag seal panel 64, the passageway 66 is sufficiently rigid to transfer forces applied to the second end 72 of the cage 72 the tubesheet panel 62 so that seal 34 prevents passage of air through the junction between the tubesheet face 63 of tubesheet panel 62 and the tubesheet 30 as described herein. In those embodiments in which the struts 74 extend to and are attached to the tubesheet panel 62 of base 60, the struts 74 may pass through the base aperture 65 in the bag seal panel 64 to reach tubesheet panel 62.

Another optional feature of one or more embodiments of a filter bag support assembly as described herein is depicted in FIG. 7 is a second cage end plane 72' seen along its edge in FIG. 7, with the second cage end plane 72' being defined by the second cage end 72. In one or more embodiments, the second cage end plane 72' may preferably be parallel to the dirty air chamber surface of the tubesheet 30.

In one or more embodiments of the filter bag support assemblies described herein, the clean air outlet defined within the flange assembly, that is, defined by the combination of the base aperture 64 and the clamp aperture 84, may be elongated such that the clean air outlet defines a maximum height along a major axis and a maximum width less than the maximum height along a minor axis that is transverse to the major axis. In terms of FIGS. 8-9, the major axis would extend generally vertically from the narrow end of the base aperture 67 and clamp aperture 87 to the opposite end of the base aperture 67 and clamp aperture 87 (along the Y axis) while the minor axis would be generally transverse to that major axis (along the X axis). Both the major axis and the minor axis would be generally transverse to the cage axis 51. In one or more embodiments, the maximum height of the clean air outlet as defined by the base apertures 64 and clamp aperture 84 may be greater than the maximum width by a factor of two or more, three or more, or four or more to provide an elongated clean air outlet as defined herein.

With reference to FIG. 7 which depicts a bag support assembly 50 configured to receive a filter bag having an enlarged (e.g., canted) bag opening as depicted in, e.g., FIG. 1, the bag seal surface 65 on the bag seal panel 64 may be described as being oriented at an angle relative to the tubesheet face 63 of the tubesheet panel 62 of base 62 provide a transition between the enlarged (e.g., canted) bag opening of filter bag 10 and the tubesheet 30 of one embodiment of a filter system as described herein.

Figure 11:
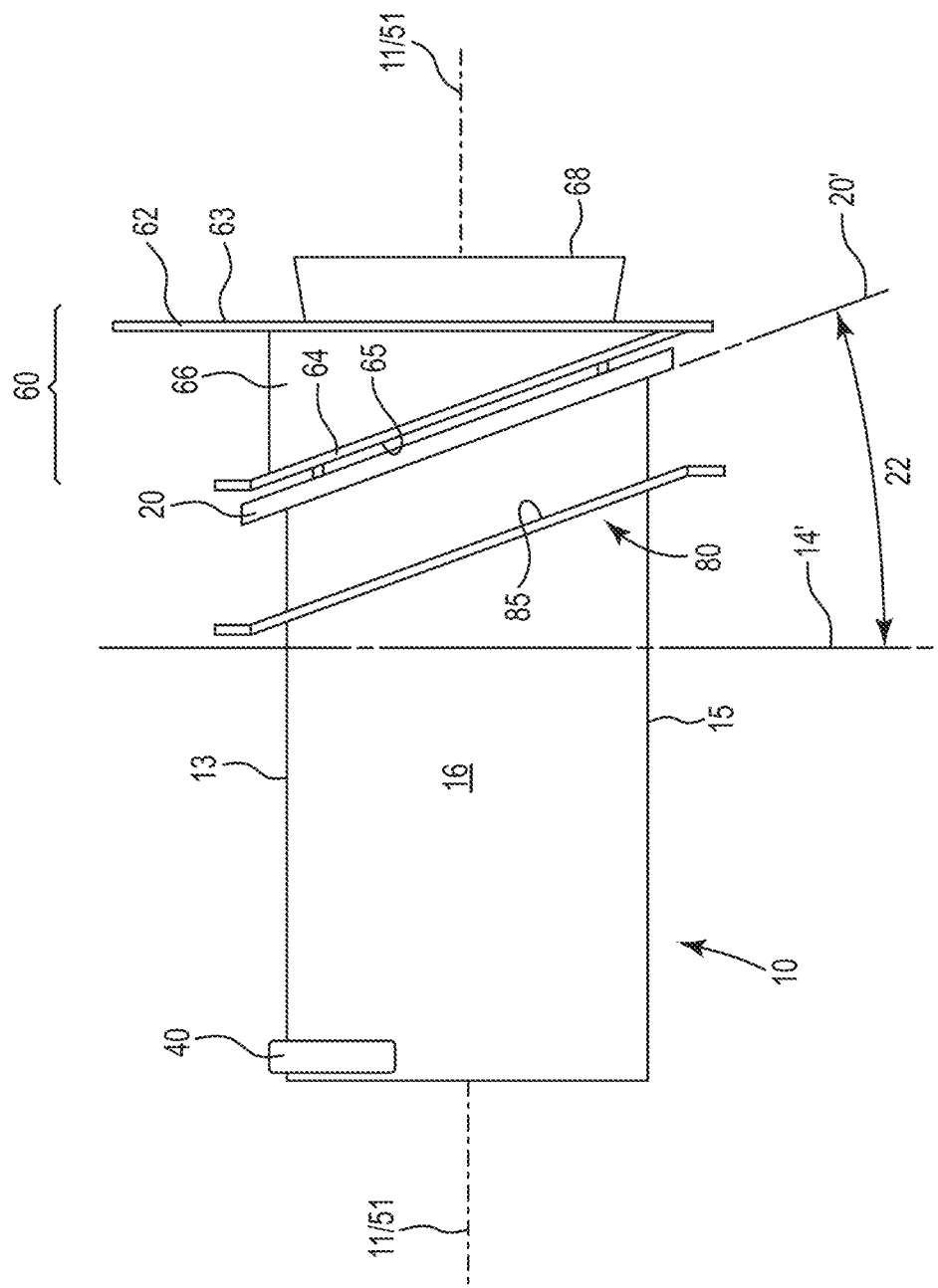
FIG. 11 is a side elevation view of the filter bag support assembly and filter bag of FIG. 10 after advancement of the filter bag to the base of the flange assembly and further advancement of the clamp towards the sealing cuff of the filter bag.

In one or more embodiments, the bag seal surface 65 may be described as defining a bag seal plane 65' and the tubesheet face 63 of the tubesheet panel 62 may be described as defining a tubesheet plane 62', with the edges of the bag seal plane 65' and the tubesheet plane 62' being depicted in FIG. 7. Also depicted in FIG. 11 is angle 22' between the bag seal plane 65' and the tubesheet plane 62'. In one or more embodiments, the angle 22' between bag seal plane 65' and tubesheet plane 62' may be 15 degrees or more, 20 degrees or more, 25 degrees or more, 30 degrees or more, 35 degrees or more, 40 degrees or more, or 45 degrees or more. At an upper end, the angle 22' between bag seal plane 65' and tubesheet plane 62' may be 60 degrees or less, 55 degrees or less, 50 degrees or less, 45 degrees or less, 40 degrees or less, 35 degrees or less, 30 degrees or less, 25 degrees or less, or 20 degrees or less.

For reasons discussed above in connection with the illustrative embodiment of filter bag 10, the angle 22' formed between bag seal plane 65' and tubesheet plane 62' (which typically matches the angle 22 formed between plane 20' and plane 14' as depicted in FIG. 1 and discussed in connection there with), it may be preferred that the angle 22' be within a range of, for example, 15 degrees to 45 degrees, or, alternatively, 20 degrees to 40 degrees.

Although the flange assembly formed by base 60 and clamp 80 of the depicted illustrative embodiment of filter bag support assembly 50 is configured to receive and retain a filter bag 10, it will be understood that the base and clamp of one or more alternative embodiments of flange assemblies used in filter bag support assemblies as described herein may take different shapes that are complementary to the shape of a bag opening of a filter bag as described herein. For example, the base and clamp of one or more alternative embodiments of filter bag support assemblies as described herein may be shaped to receive and retain filter bags having bag openings/sealing cuffs as depicted in FIGS. 4-6.

Another optional feature that may be provided in connection with one or more embodiments of a filter bag support assembly as described herein is a guide aperture 90. The guide aperture 90 may be located outside of the cage 70 attached to the base 60 as well as the clean air outlet as defined by the base aperture 67 and clamp aperture 87. The guide aperture 90 is, in one or more embodiments, configured to receive a guide rail 92 attached to the tubesheet 30 when the clamp 80 is attached to the base 60 of the flange assembly (constituted by the base 60 and clamp 80). When the guide aperture 90 is positioned on the guide rail 92, the filter bag support assembly 50 can be described as being configured for advancement along the guide rail 92 towards the tubesheet 30 as described herein.

The guide aperture 90 may, in one or more embodiments, be formed in only one of the base 60 and the clamp 80. In flange assemblies that have both a tubesheet panel 62 and a bag seal panel 64, the guide aperture 90 could be provided in one or both of the tubesheet panel 62 and the bag seal panel 64. In one or more alternative embodiments, the guide aperture 90 may be formed in the clamp 80 of a flange assembly formed by clamp 80 and base 60.

The depicted embodiment of guide rail 92 also includes an optional bag connector 94 that may, in one or more embodiments, be configured to retain a bag support connection on a filter bag mounted on the filter bag support assembly 50 such as, e.g., connector 40 on filter bag 10 depicted in FIGS. 1-2.

Filter Bag Assembly

FIG. 10 is a side elevation view of the filter bag support assembly of FIG. 7 (removed from the tubesheet) with one illustrative embodiment of a filter bag 10 as depicted in FIGS. 1-3 partially advanced over the cage 70 extending from the base 60 of the flange assembly.

As seen in FIG. 10, bag opening 12/sealing cuff 20 of the filter bag 10 is oriented generally perpendicular to the bag axis 11/cage axis 51 so that the enlarged bag opening 12/sealing cuff 20 can be used to more easily advance the filter bag 10 over the cage 70.

In the depicted embodiment of filter bag 10, a portion 17 of the bottom edge 15 of the filter bag 10 is folded or compressed to properly orient the back opening 12/sealing cuff 20 as seen in FIG. 10. As seen in FIG. 10, the struts 74 of the cage 70 attached to the base 60 extend into the filter bag 10.

In one or more embodiments, the distance between the junctions of the top edge 13 and bottom edge 15 of the filter bag 10 with the bag opening 12/sealing cuff 20 when the bag opening 12/sealing cuff 20 is oriented as depicted in FIG. 10 may be described as being greater than the distance between the top and bottom struts 74 of cage 70. That arrangement provides, in one or more embodiments, the additional clearance to assist with advancement of the filter bag 10 over the cage 70 as described herein.

Also depicted in FIG. 10 is the clamp 80 which is also partially advanced over the filter bag 10 and the cage 70. Although not previously described, FIG. 10 depicts that advancement of the clamp 80 over the filter bag 10 and cage 70 may also be performed with less interference between the filter bag 10 and the clamp aperture (see, e.g., clamp aperture 87 in FIG. 9) by orienting the clamp 80 similar to the back opening 12/sealing cuff 22 take advantage of the larger size of the clamp aperture in that orientation.

FIG. 11 depicts the filter bag support assembly and filter bag of FIG. 10 after advancement of the filter bag 10 to the base 60 of the flange assembly and further advancement of the clamp 80 towards the bag opening 12/sealing cuff 20 of the filter bag 10. As seen in FIG. 11, the portion of the bag opening 12/sealing cuff 20 approximate the bottom edge 15 of the filter bag 10 has been extended to place the bag opening 12/sealing cuff 20 against the bag sealing surface 65 of bag seal panel 64 of base 60. In addition, the clamp 80 has also been rotated to place the clamp sealing surface 85 on clamp 80 in its proper orientation so that the sealing cuff 20 on filter bag 10 can be retained between the clamp sealing surface 85 of clamp 80 and bag ceiling surface 65 of base 60.

When fully advanced into contact with the sealing cuff 20 and attached to the base 60, a seal is formed between the base 60 and the clamp 80 around the clean air outlet formed by the base aperture 67 and the clamp aperture 87. In one or more embodiments, the sealing cuff 20 may be described as surrounding the clamp aperture 87 in the clamp 80 as well as the base aperture 67 in the base 60 (which, in the depicted illustrative embodiment, is located in bag sealing panel 64 as described herein).

With the seal formed by sealing cuff 20 between base 60 and clamp 80, air (or any other gas) passing into or out of the interior volume of the filter bag must pass through the clean air outlet or the filter media forming the body 16 of the filter bag 10. In one or more embodiments, the sealing cuff 20 is preferably compressed between the base plate and the clamp. As used herein, the term "compressed" means that the sealing cuff 20 has been at least partially deformed between the base 60 and the clamp 80.

Filter Systems

The filter bags, filter bag support assemblies, and filter bag assemblies described herein can all be used in any suitable filter system (sometimes referred to as a collector) to remove particulate matter from a gas stream (e.g., air) in which particulate matter is entrained. Although the filter systems, filter bag support assemblies, filter bag assemblies, and filter bags described below and depicted in, e.g., FIGS. 12-14, 15A, 15G, 16, 17A, 24, and 25 do not, themselves, include enlarged bag openings or features designed to accommodate filter bags having enlarged bag openings as described herein, it will be understood that the filter systems, filter bag support assemblies, and filter bag assemblies could easily accommodate (or be configured to accommodate) filter bags having enlarged bag openings as described herein.

Figure 12:
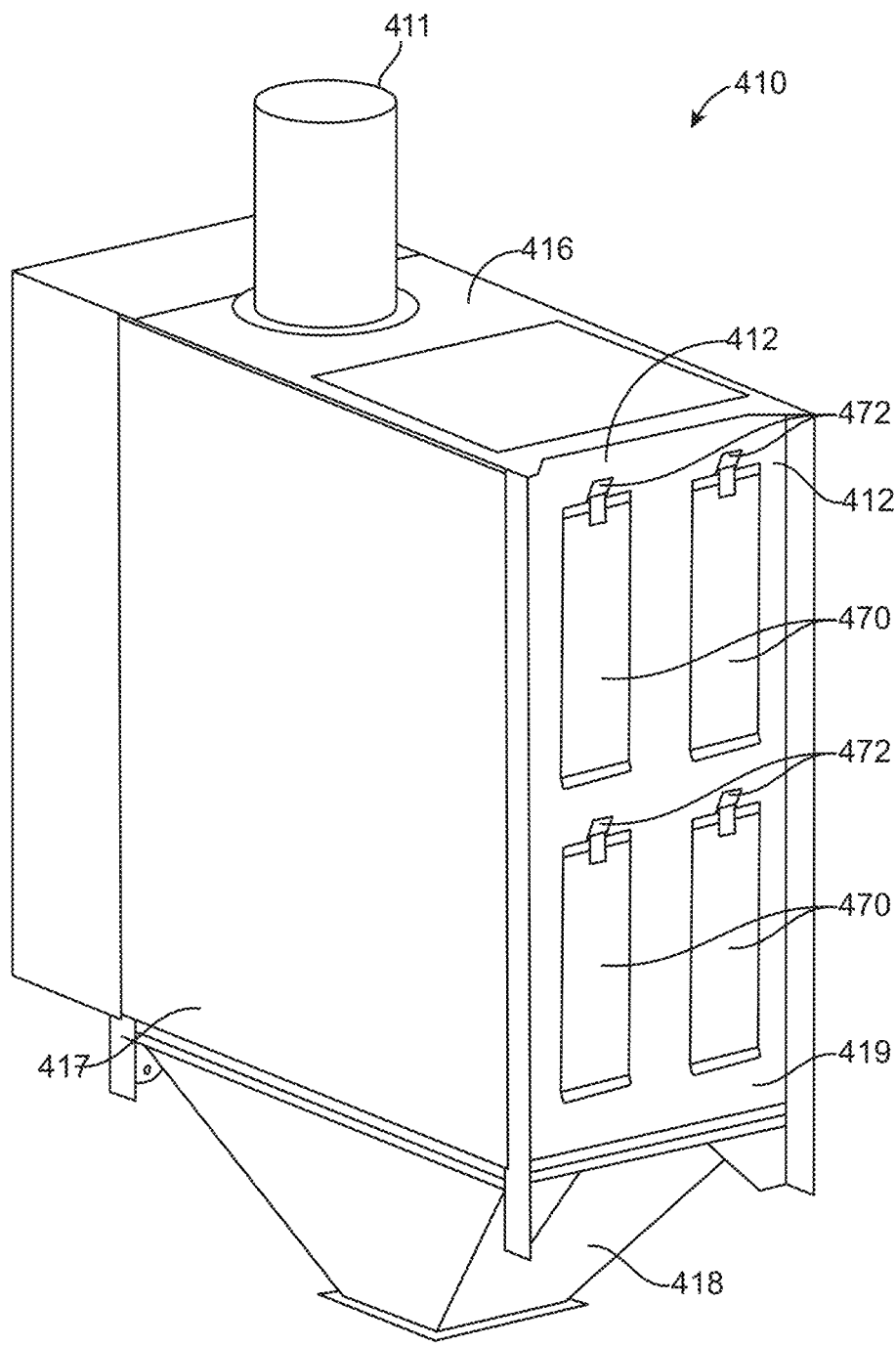
FIG. 12 is a perspective view of one illustrative embodiment of a filter system as described herein.

One illustrative embodiment of a filter system is depicted generally at 410 in FIG. 12 and is generally in the shape of a box and includes an upper wall panel 416, and two pairs of opposite side wall panels 417 (one of which is visible in FIG. 12). The filter system 410 includes a dirty air conduit 411 for receiving dirty or contaminated gas (e.g., air with particulate matter entrained therein) into the filter system 410. A clean gas (e.g., air) conduit 413 (see, e.g., FIG. 14) may be provided for removing clean or filtered air from the filter system 410. The filter system 410 includes covers 470 closing access ports in the access panel 419 of the filter system 410.

The filter system 410 may also include a hopper 418 to collect particulate matter separated from the dirty air stream as described herein. The hopper 418 may include sloped walls to facilitate collection of the particulate matter and may, in some embodiments, include a driven auger or other mechanism for removing the collected particulate matter.

Figure 13:
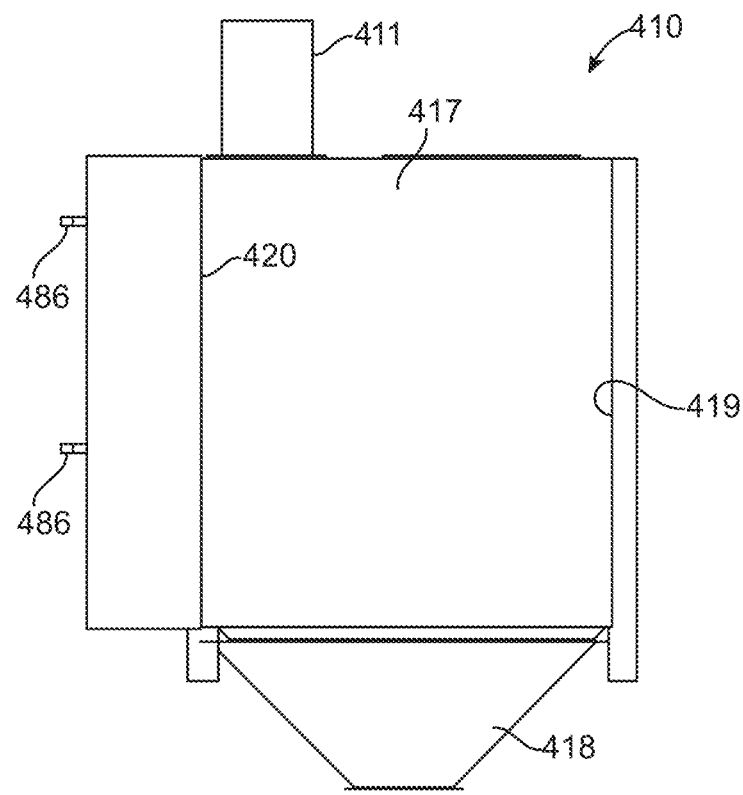
FIG. 13 is a side view of the filter system depicted in FIG. 12.
Figure 14:
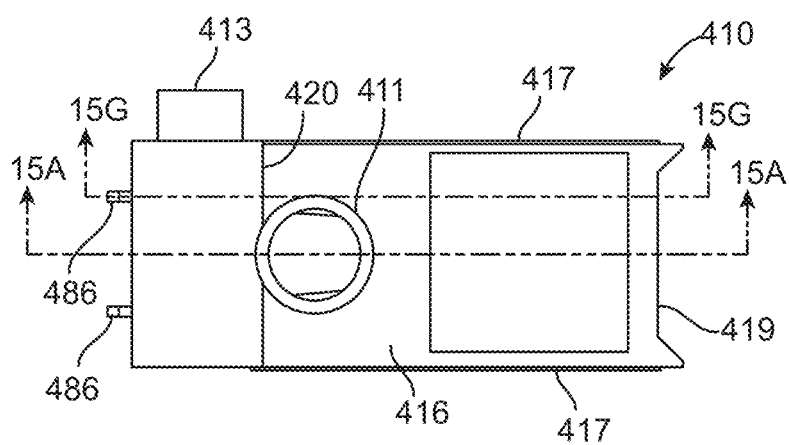
FIG. 14 is a top view of the filter system depicted in FIGS. 12 and 13.

The filter system of FIG. 12 is depicted in a side elevation in FIG. 13 and a top plan view in FIG. 14. The filter system 410, as seen in FIGS. 13 and 14, includes connectors 486 in fluid communication with pulse generators (not depicted in FIGS. 12-14) as part of a pulse-jet cleaning system, with the pulse generators configured to direct a pulse of air into the filter bags as described herein.

Figure 15A:
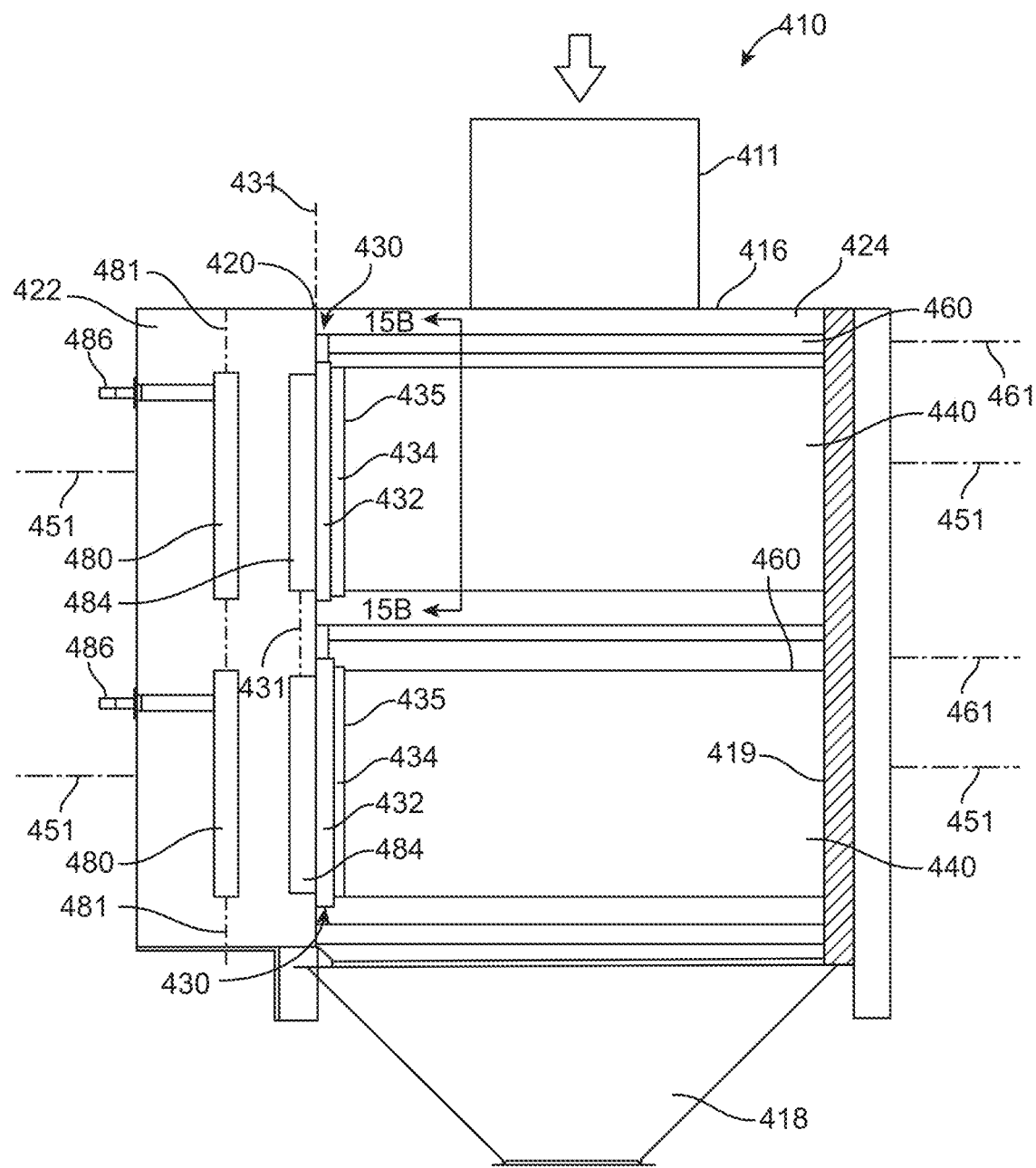
FIG. 15A is a cross-sectional view of the filter system of FIGS. 12-14 taken along line 15A-15A in FIG. 14.
Figure 15B:
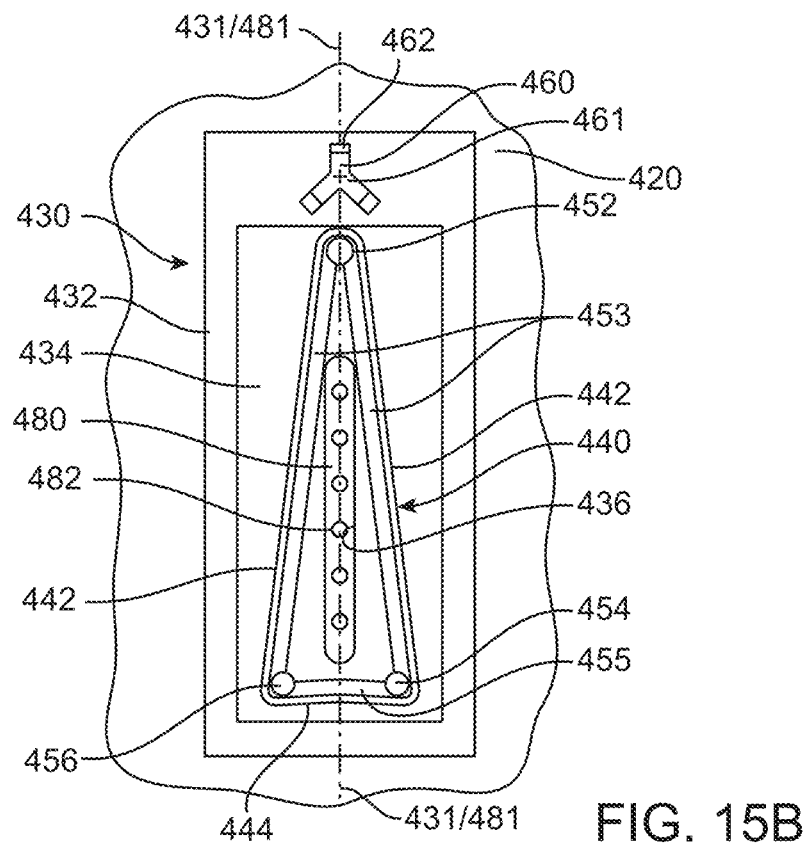
FIG. 15B is a cross-sectional view of the filter system of FIG. 14 taken along line 15B-15B in FIG. 15A when the system is out of service.
Figure 15C:
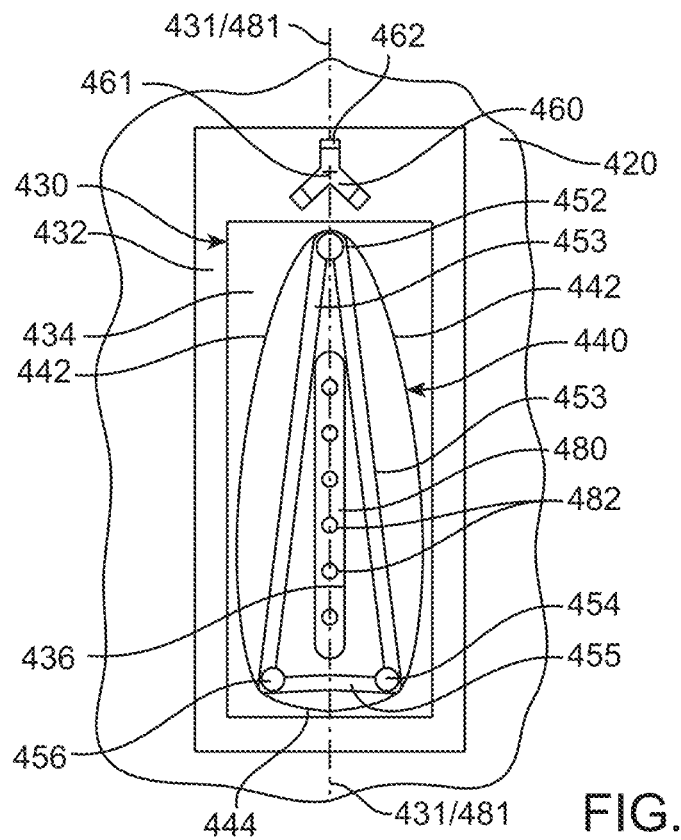
FIG. 15C is a cross-sectional view of the filter system of FIG. 14 taken along line 15B-15B in FIG. 14 during a pulse cleaning event.
Figure 15D:
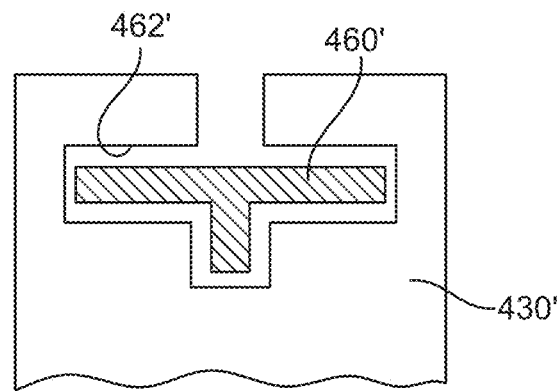
FIGS. 15D-15F depict some alternative embodiments of filter guides and corresponding guide apertures that may be provided in one or more embodiments of filter systems as described herein.
Figure 15E:
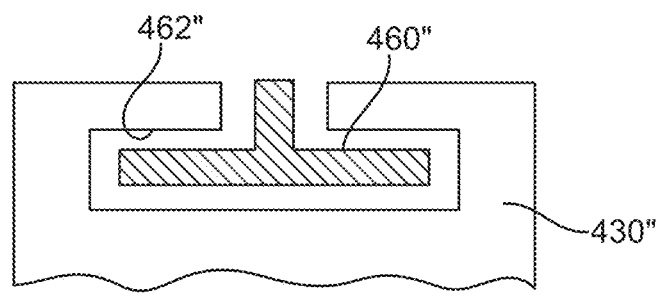
Figure 15F:
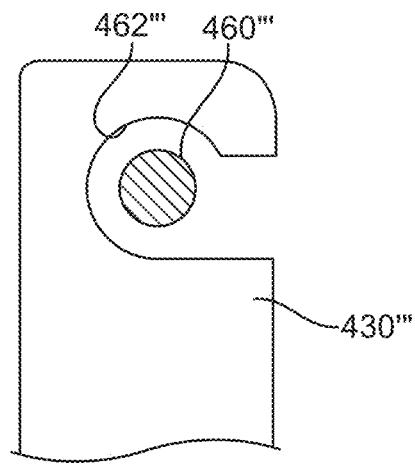
Figure 15G:
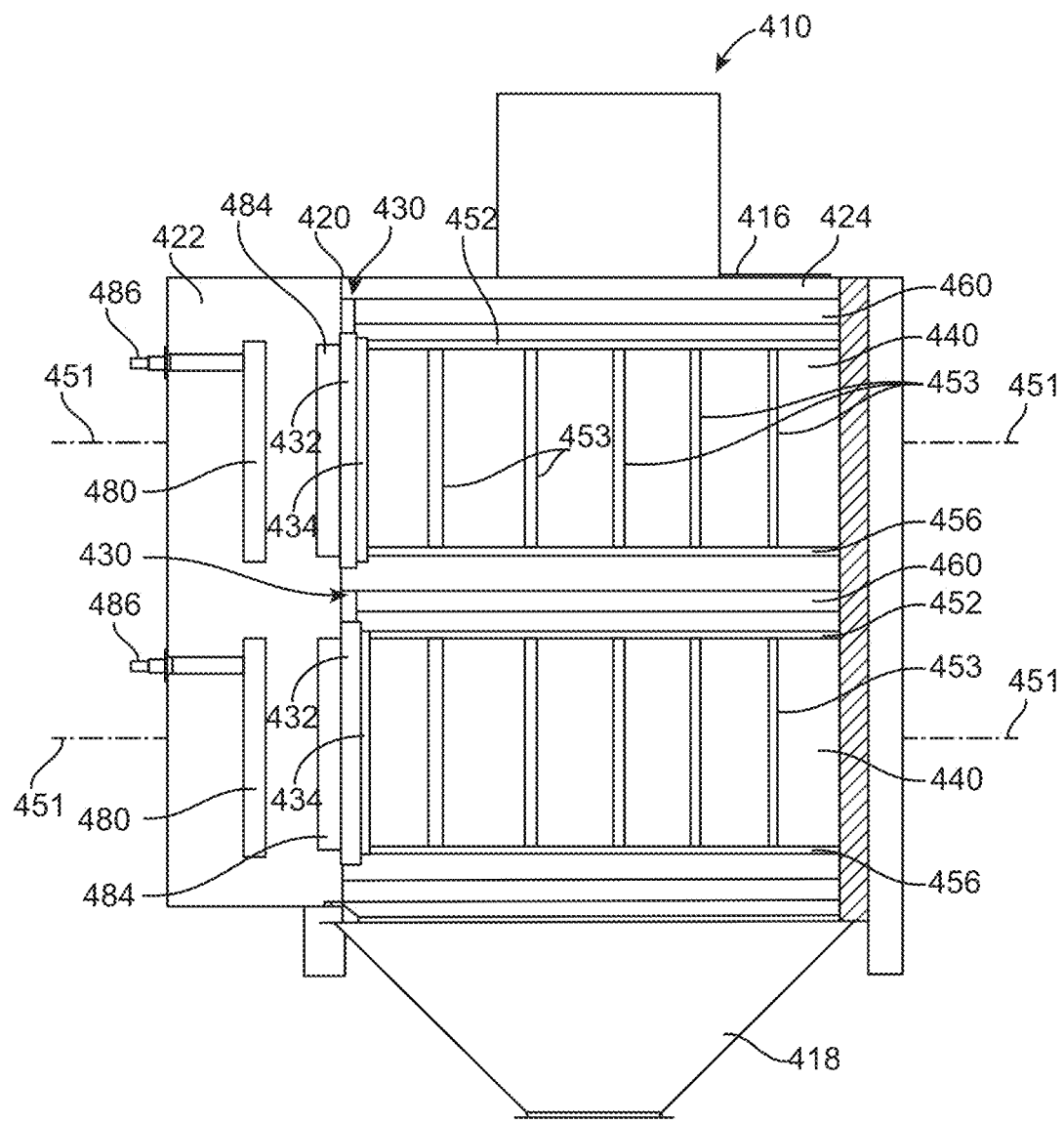
FIG. 15G is a cross-sectional view of the filter system of FIGS. 12-14 taken along line 15G-15G in FIG. 14.

With reference to FIGS. 15A and 15G, the depicted filter system 410 includes filter bag assemblies including filter bags 440 and flange assemblies 430 in a dirty air chamber 424 that is separated from a clean air chamber 422 by a tubesheet 420. FIG. 15A is a cross-sectional view of the filter system 410 taken along line 15A-15A in FIG. 14 and shows the interior of the filter system 410 (with the filter bags 440 located therein being intact such that the support structure within the filter bags 440 is obscured from view). FIG. 15G is a cross-sectional view of the filter system 410 taken along line 15G-15G in FIG. 14 (with the cross-sectional view depicting the interior volume of the filter bags 440 such that a portion of the support structure within the filter bags 440 is depicted). The filter bag assemblies are mounted on filter guides 460 located in the dirty air chamber 424. In the depicted illustrative embodiment, the filter guides 460 extend across the dirty air chamber 424 from the tubesheet 420 to the access panel 419 of the filter system.

At the tubesheet end, each of the filter bag assemblies includes a flange assembly 430. The flange assembly 430 includes an interior face 435 facing the dirty air chamber 424 and a tubesheet face that seals against the dirty air chamber side of the tubesheet 420. Each of the flange assemblies 430 surrounds an aperture in the tubesheet 420 through which clean air can pass from the interior of a filter bag assembly into the clean air chamber and through which a pulse of air can pass into the interior of a filter bag during a pulse cleaning event.

Although the flange assemblies 430 on each of the filter bag assemblies are described in more detail herein, the flange assemblies 430 seen in FIG. 15A include a base 432 including the tubesheet face of the flange assembly 430 and a clamp 434 configured to attach to the base 432 on the interior face of the flange assembly 430. In such an embodiment, the clean air outlet extends through the base 432 and the clamp 434, with the bag opening of the filter bag 440 being retained between the clamp 434 and the base 432 on the interior face of the flange assembly 430.

The illustrative embodiment of filter system 410 as depicted in FIG. 15A also includes pulse generators 480 located in the clean air chamber 422. The pulse generators 480 are configured to deliver pulses of air into the interior volumes of the filter bags 440 to drive particulate matter that has accumulated on the filter bags 440 during use of the filter bags, with the dislodged particulate matter preferably falling into the hopper 418 located below the filter bags 440. In one or more embodiments, the pulse generators 480 may be described as having elongated shapes that extend along pulse generator axes 481 as seen in, e.g., FIG. 15A. Pressurized air (or any other suitable gas) is delivered to the pulse generators through connectors 486 that, in the depicted embodiment, extend outside of the clean air chamber 422 for connection to a pulse cleaning system including one or more sources of pressurized gas (e.g., air), valves and a control system. Illustrative embodiments of pulse cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

Also depicted in connection with the illustrative embodiment of filter system 410 are pulse collectors 484 which, as will be described herein, may be attached to the flange assemblies 430 of the filter bag assemblies. In other embodiments, the pulse collectors 484 may be attached to the tubesheet 420. Regardless of the structure to which they are attached, the pulse collectors 484 are configured to direct pulsed air emitted from the pulse generators 480 into the interior volumes of the filter bags 440 during the pulse cleaning process.

FIGS. 15B and 15C are cross-sectional views taken along line 15B-15B in FIG. 15A, with FIG. 15B being taken when the filter system 410 is either not in use or is being used to filter dirty air entering the dirty air chamber 424 through inlet 411. FIG. 15C depicts the filter bag 440 relative to the other structures of the filter bag assembly during a pulse cleaning event when pressurized air (or other gas) is delivered into the interior volume of the filter bag 440 as described herein.

FIG. 15B depicts a portion of the dirty air chamber side of the tubesheet 420 with flange assembly 430 located thereon. As discussed herein, the depicted illustrative embodiment of flange assembly 430 includes a base 432 and a clamp 434, with the bag opening of the filter bag 440 being retained between the clamp 434 and the base 432 such that air can enter the interior volume of filter bag 440 only by passing through the filter media used to construct filter bag 440 or by passing through the clean air outlet 436 of the flange assembly 430.

The filter bag assembly as seen in FIGS. 15B and 15C includes a cage used to hold the depicted filter bag 440 in a triangular shape (with the cage being seen in the cross-sectional view of FIG. 15G). In the depicted illustrative embodiment, the cage includes a first cage end attached to the flange assembly 430, with the cage extending away from the flange assembly 430 over a cage length along a cage axis 451 to a second cage end distal from the flange assembly 430. In the depicted illustrative embodiment, the second cage is located proximate the access panel 419 of the filter system 410.

In the depicted illustrative embodiment of the filter bag assembly, the cage includes a plurality of struts that extend away from the interior face of the flange assembly 430 towards the second cage end proximate the access panel 419 of the filter system 410. The plurality of struts define a triangular shape such that, in each cross-section taken in a plane transverse to the cage axis 451 over a majority of the length of the cage, the plurality of struts define a triangle having a top vertex and a pair of bottom vertices opposite the top vertex.

In the depicted illustrative embodiment, the cage includes a top strut 452 and a pair of bottom struts 454 and 456. The top strut 452 defines a top vertex of the triangles defined by the plurality of struts, while the pair of bottom struts 454 and 456 defined the bottom vertices of the triangles defined by the plurality of struts. The depicted illustrative embodiment of the cage also includes a series of braces 453 extending from the top strut 452 to each of the bottom struts 454 and 456 to provide additional support to the filter bag 440 at selected locations along the length of the cage.

When the cage is located in the filter bag 440, the filter media of the filter bag 440 may be described as defining a pair of side surfaces 442 and a bottom surface 444. Each of the side surfaces 442 includes a top edge proximate the top vertex (as defined by the top strut 452) of each triangle defined by the plurality of struts. Moreover, each side surface 442 also includes a bottom edge distal from the top edge of the side surface 442. With reference to FIG. 15B, the bottom edge of the right side surface 442 is defined by the right side bottom vertex (as defined by bottom strut 454) of each triangle defined by the plurality of struts, while the bottom edge of the left side surface 442 is defined by the left side bottom vertex (as defined by bottom strut 456) of each triangle defined by the plurality of struts.

Because the filter bags used in the filter bag assemblies of filter systems as described herein are made of generally flexible filter media, the top edges and bottom edges of the triangular-shaped filter bags may not be particularly distinct, i.e., the edges may not form a single line. It will, however, be understood that the edges may have a width around which the filter media extends when moving from the side surfaces 442 to the bottom surface 444 around the bottom struts 454 and 456 and/or when moving from one side surface 442 to the opposite side surface over the top strut 452. Regardless of that lack of distinctiveness, the edges will be understood as conforming generally to the shape of the struts used to define the different vertices of the triangles.

The triangular shapes defined by the plurality of struts in the illustrative embodiment of the cage as seen in FIGS. 15B and 15C are only one example of the triangular shapes that may be used in connection with filter bag assemblies and filter systems as described herein. In general, however, one or more embodiments of the filter bag assemblies described herein may be described as having a bottom surface 444 of filter media having a width measured between the bottom edges of the side surfaces 442 (as defined by the bottom struts 454 and 456) that is less than a height of either of the side surfaces 442 as measured between their top edges and bottom edges (where the top edges are defined by the top strut 452 and the bottom edges are defined by the bottom struts 454 and 456). In one or more embodiments, the width of the bottom surface 444 may be 50% or less, 40% or less, 30% or less, 20% or less, 15% or less, 12% or less, 10% or less, 8% or less, or 5% or less of the height of either side surface 42 of the pair of side surfaces. At a lower end, the width of the bottom surface may be 4% or more, 5% or more, 6% or more, 8% or more, 10% or more, 12% or more, 15% or more of the height of either side surface of the pair of side surfaces. The width and height as discussed herein are measured transverse to the cage axis 451, i.e., as seen in, e.g., FIG. 15B.

Other features depicted in the cross-sectional views of FIGS. 15B and 15C include filter guide 460 which, in the depicted illustrative embodiment, extends from the tubesheet 420 to the access panel 419 of the dirty air chamber 424. In the depicted illustrative embodiment, the filter guide 460 defines a guide axis 461 passing through the tubesheet 420 and the access panel 419. The depicted guide axis 461 is aligned with the cage axis 451 and, although, the two axes 451 and 461 may be parallel with each other, a perfectly parallel arrangement is not required.

Filter guide 460 includes an entry end 463 at which the guide aperture 462 on the flange assembly 430 can be threaded, guided, or otherwise directed onto the filter guide 460 so that the flange assembly 430 can be supported on the filter guide 460. In one or more embodiments, the entry end 463 of the filter guide 460 may be located closer to the access panel 419 of the filter system than the tubesheet 420 against which the flange assembly 430 is forced as described herein.

Although the filter guide 460 extends from the tube sheet 420 to the access panel 419 in some of the depicted illustrative embodiments described herein, in one or more alternative embodiments, the filter guide 460 may only extend partially across the dirty air chamber such that, e.g., the filter guide 460 may terminate at a location short of the access panel 419 or even short of the tube sheet 420. In one alternative embodiment, for example, the filter guide 460 may extend from the tubesheet 420 towards the access panel 419 but terminate short of the access panel 419.

The filter guide 460 is located within a guide aperture 462 formed in the flange assembly 430. The combination of the filter guide 460 and the guide aperture 462 formed in the flange assembly 30 provides support to the flange assembly 430 during insertion and removal of a filter bag assembly from the dirty air chamber 424 of the filter system 410. In particular, it may be preferred that the filter guide 460 and guide aperture 462 allow for translational or sliding movement of the flange assembly 430 through an access port in the access panel 419 to the tubesheet 420. Although the depicted filter guide 460 and guide aperture 462 in the flange assembly 430 have similar shapes, any suitable combination of shapes for both the filter guide and the guide aperture may be used.

Some alternative embodiments of filter guides and guide apertures are depicted in FIGS. 15D-15F. In FIG. 15D, the filter guide 460' has a T-shaped profile and the guide aperture 462' in flange assembly 430' has a complementary shape configured to accept the filter guide 460'. In FIG. 15E, the filter guide 460" has an inverted T-shaped profile and the guide aperture 462" in flange assembly 430" has a complementary shape configured to accept the filter guide 460". In FIG. 15F, the filter guide 460''' has a round profile and the guide aperture 462''' in flange assembly 430''' has a complementary shape configured to accept the filter guide 460'''. Many other alternative shapes for filter guides and guide apertures could also be provided.

In addition to providing support to the flange assembly 430 in a vertical direction, the combination of filter guide 460 and guide aperture 462 may, in one or more embodiments, also serve to limit or prevent rotation of the flange assembly around the guide axis 461 so that proper alignment of the flange assembly 430 on the tubesheet 420 may be achieved. To limit or prevent such rotation, the filter guide 460 and guide aperture 462 on the flange assembly 430 may have a noncircular shapes, with the tri-lobed and T-shaped examples of the depicted illustrative embodiments providing examples of only some noncircular shapes that may limit or prevent rotation of the flange assembly 430 relative to the guide axis 461.

In one or more embodiments, the filter guide 460 may include a dust cover to prevent accumulation of particulate matter on the filter guide 460 that could be dislodged during removal of the filter bag assembly (e.g., as the flange assembly 430 moves from the tubesheet 420 towards the access panel 419).

Other features depicted in the cross-sectional views of FIGS. 15B and 15C include the clean air outlet 436 provided in the flange assembly 430 which allows both clean air to exit the interior volume of the filter bags 440 and also allows for pulses of air or other gases to enter the interior volume during a pulse cleaning process. In one or more embodiments, the clean air outlet may be described as having an elongated shape that extends from a top end (closest to the top strut 452) and a bottom end (closest to the bottom struts 454 and 456). The top end and the bottom end of the clean air outlet 436 may further be described as defining an outlet axis 431 that extends between the top and bottom ends of the clean air outlet 436. In one or more embodiments, a projection of the outlet axis 431 along the cage axis 451 passes between the pair of bottom vertices of the triangles defined by the plurality of struts (where those bottom vertices are defined by the bottom struts 454 and 456). Further, the projection of the outlet axis 431 passes through the top vertex (as defined by the top strut 452) of the triangles defined by the plurality of struts.

Although not depicted in FIGS. 15B and 15C, will be understood that tubesheet 420 includes a tubesheet aperture formed therethrough that is at least as large as the clean air outlet 436 provided in the flange assembly 430 such that the tubesheet aperture does not restrict airflow through the clean air outlet 436 into or out of the interior volume of the filter bag 440. Furthermore, the tubesheet aperture may also be described as having a size that is smaller than the flange assembly 430 such that the flange assembly 430 can close or seal the tubesheet aperture such that air passing between the clean air chamber 422 and dirty air chamber 424 must pass through the clean air outlet 436 when the filter system 410 is operational.

The cross-sectional views of FIGS. 15B and 15C also depicts the alignment between pulse generators 480 and the clean air outlet 436 of the flange assemblies 430 in the depicted illustrative embodiment of filter system 410. In particular, the pulse generators 480 may be aligned with the clean air outlet 436. Even more particularly, the pulse generator axis 481 may be aligned with the outlet axis 431 when viewed along the cage axis 451 as seen in FIGS. 15B and 15C.

The views of FIGS. 15B and 15C further depict the ports 482 of pulse generator 480. In particular, the ports 482 face the clean air outlet 436 and the aperture in the tubesheet 420. Air delivered through the ports 482 of the pulse generator 480 passes through those ports and into the clean air outlet 436 formed in flange assembly 430.

When the filter bags used in filter systems as described herein have generally triangular shapes, various features may be incorporated into the ports 482 of the pulse generators 480 to facilitate the pulse cleaning process. For example, in one or more embodiments, the ports 482 closer to the bottom end of the clean air outlet 436 (i.e., closer to the bottom 444 of the filter bag 440) may be larger in size than ports 482 located closer to the top end of the clean air outlet 436 (i.e., closer to the top edges of the sides 442 of the filter bag 440). Alternatively, or in addition, the spacing between ports 482 may vary along the pulse generator axis 481. For example, the spacing between the ports 482 located closer to the bottom end of the clean air outlet 436 may be smaller than the spacing between the ports 482 located closer to the top end of the clean air outlet 436. Such variations in size and/or spacing of the ports 482 may facilitate the pulse cleaning process by providing more air and or higher pressures within the filter bag 440 proximate the bottom surface 444.

A comparison of FIGS. 15B and 15C illustrates the beneficial effects of the triangular-shaped filter bags described herein with respect to particular loading and pulse cleaning. In particular, as seen in FIG. 15B the triangular shaped filter bag 440 includes a bottom surface 444 that faces downwardly away from the dirty air inlet 411 into dirty air chamber 424 (see, e.g., FIG. 15A). Particulate matter introduced into the dirty air chamber 424 above the triangular filter bag 440 does not, therefore, impinge directly on or, under the force of gravity alone, collect on the bottom surface 444 of the filter bag 440. This improves particulate loading performance of the filter bag 440 because only particulate matter entrained in dirty air that reaches the bottom surface 444 can be captured on the bottom surface 444.

Improvements in pulse cleaning performance are also provided by the triangular-shaped filter bag 440 because particulate matter that does collect on the bottom surface 444 of the filter bag 440 is directed downwardly away from the bottom surface 444 during pulse cleaning. With reference to FIG. 15C, the bottom surface 444 of the filter bag 440 is forced outwardly/downwardly during pulse cleaning. By virtue of the nature of pulse cleaning, that outward/downward movement of the bottom surface 444 is a result of rapid acceleration which imparts a force to any dislodged particulate matter released from the bottom surface 444, with the vector of that pulse cleaning force being generally aligned with the force of gravity to enhance movement of any dislodged particulate matter into a collection area such as, e.g., hopper 418 of filter system 410.

In addition to the beneficial effects of the bottom surface 444 of the triangular-shaped filter bags 440 of filter systems as described herein, the side surfaces 442 of the filter bags 440 are also rapidly accelerated outward during pulse cleaning as seen in the changed positions of the sides 442 of filter bag 440 between FIGS. 15B and 15C. As discussed herein, such movement of the sides 442 of the triangular-shaped filter bags 440 provides many of the same advantages in pulse cleaning performance associated with conventional envelope-shaped filter bags having vertical sides.

Figure 16:
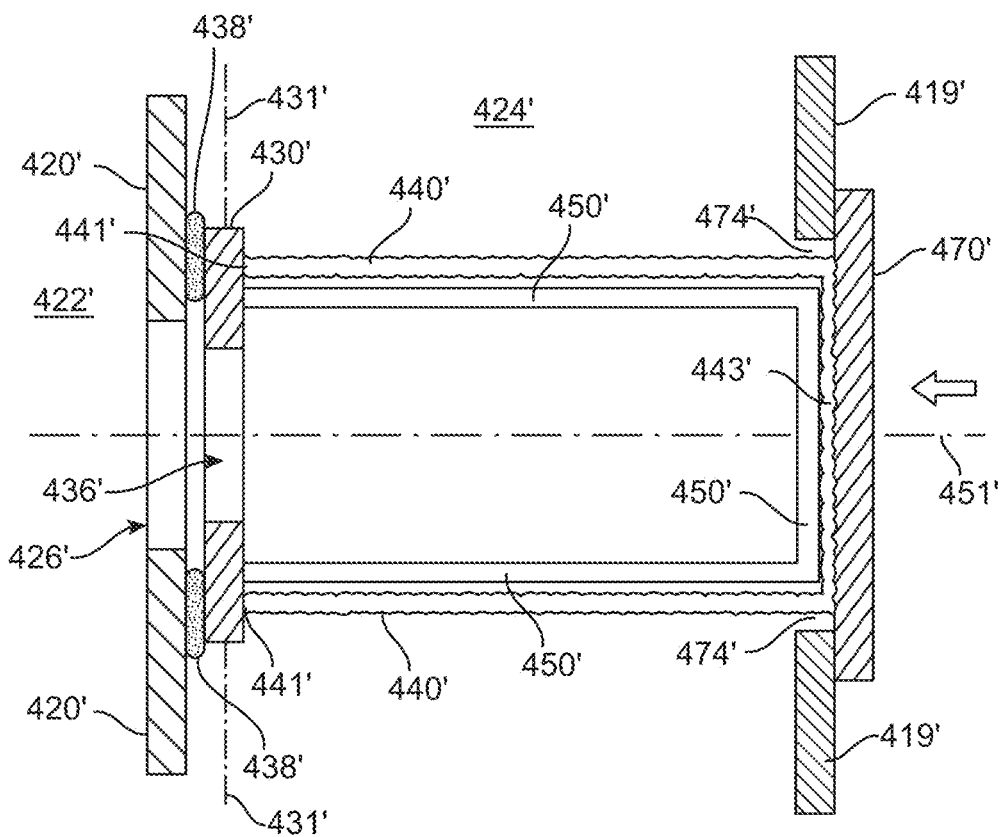
FIG. 16 is a schematic diagram of components of one illustrative embodiment of a filter system as described herein illustrating the seal formed using a filter bag assembly as described herein.

FIG. 16 is a simplified schematic diagram of components of the illustrative embodiment of filter system depicting one illustrative embodiment of a seal formed using a filter bag assembly in a filter system as described herein. In the depicted illustrative embodiment, the filter bag assembly includes a flange assembly 430' and a cage 450' attached to the flange assembly 430'.

A filter bag 440' is attached to the filter bag assembly, with bag opening 441' being sealed against flange assembly 430' and the cage 450' located within the interior volume defined by the filter bag 440'. For reference, clean air outlet 436' extends along an outlet axis 431' in a manner similar to the outlet axis 431 depicted in, e.g., FIGS. 15A-15C.

Cage 450' defines a cage axis 451' that extends through clean air outlet 436' defined in flange assembly 430'. Cage 450' may also be described as including a first cage end attached to the flange assembly 430' and a second cage end distal from the flange assembly 430' along the cage axis 451'. The second cage end of the cage 450' may also be described as being proximate the second end 443' of the filter bag 440'.

Tubesheet 420' includes aperture 426' formed through the tubesheet 420'. Clean air chamber 422' and dirty air chamber 424' are also indicated in FIG. 16, with the two chambers being separated by the tubesheet 420'. Flange assembly 430' is positioned over the aperture 426' in tubesheet 420' such that air passing into and out of the interior volume of the filter bag 440' from the clean air chamber 422' passes through the aperture 426' and the clean air outlet 436' in the flange assembly 430'.

FIG. 16 also depicts the access panel 419' located opposite tubesheet 420' across the dirty air chamber 424'. Access port 474' is provided in access panel 419' to allow for removal and replacement of the filter bag assembly (including flange assembly 430', filter bag 440', and cage 450' attached to flange assembly 430' and located within the interior volume of the filter bag 440'). Access port 474' is closed by cover 470' to seal the dirty air chamber 424' during operation of the filter system.

Also depicted in FIG. 16 is a seal 438' located between a tubesheet face of the flange assembly 430' and the tubesheet 420'. Seal 438' is located around aperture 426' in tubesheet 420' as well as being located around clean air outlet 436' in flange assembly 430'. Seal 438' ensures that air passing into the interior volume of the filter bag 440' must pass either through the filter media forming filter bag 440' (during, e.g., filtering) or the clean air outlet 436' and aperture 426' in tubesheet 420. In other words, the seal 438' between flange assembly 430' and tubesheet 420' prevents air (and preferably any particulate matter) from passing between the tubesheet face of the flange assembly 430' and the tubesheet 420' during operation of a filter system as described herein.

In one or more embodiments, seal 438' may be formed by compression between the flange assembly 430' and the tubesheet 420'. In one or more embodiments, a seal actuator may be provided to apply a seal force on the cage 450' of the filter bag assembly. In such embodiments, the seal force is preferably directed along the cage axis 451 towards the tubesheet 420'. In one or more embodiments, the seal force may be described as being directed through the second end 443' of the filter bag 440' and further being transferred to the seal 438' through the filter bag 440', cage 450', and flange assembly 430'. In particular, the cover 470', which functions as the seal actuator in the depicted illustrative embodiment, acts on the second (closed) end 443' of the filter bag 440' which, in turn, acts on the second cage end of the cage 450', with the cage 450' transferring that force to the flange assembly 430' by virtue of its attachment to the flange assembly 430'.

Seal 438' may be constructed of any suitable material and/or structures. Although many seals may be formed by compression of one or more resilient and/or elastomeric materials (in, e.g., O-rings, gaskets, etc.), other seal constructions may also be used to form the required seal between the flange assembly and the tubesheet in filter systems as described herein when the flange assembly is subjected to a compression force (e.g., knife edge seals, radial seals, axial seals, etc.).

Figure 17A:
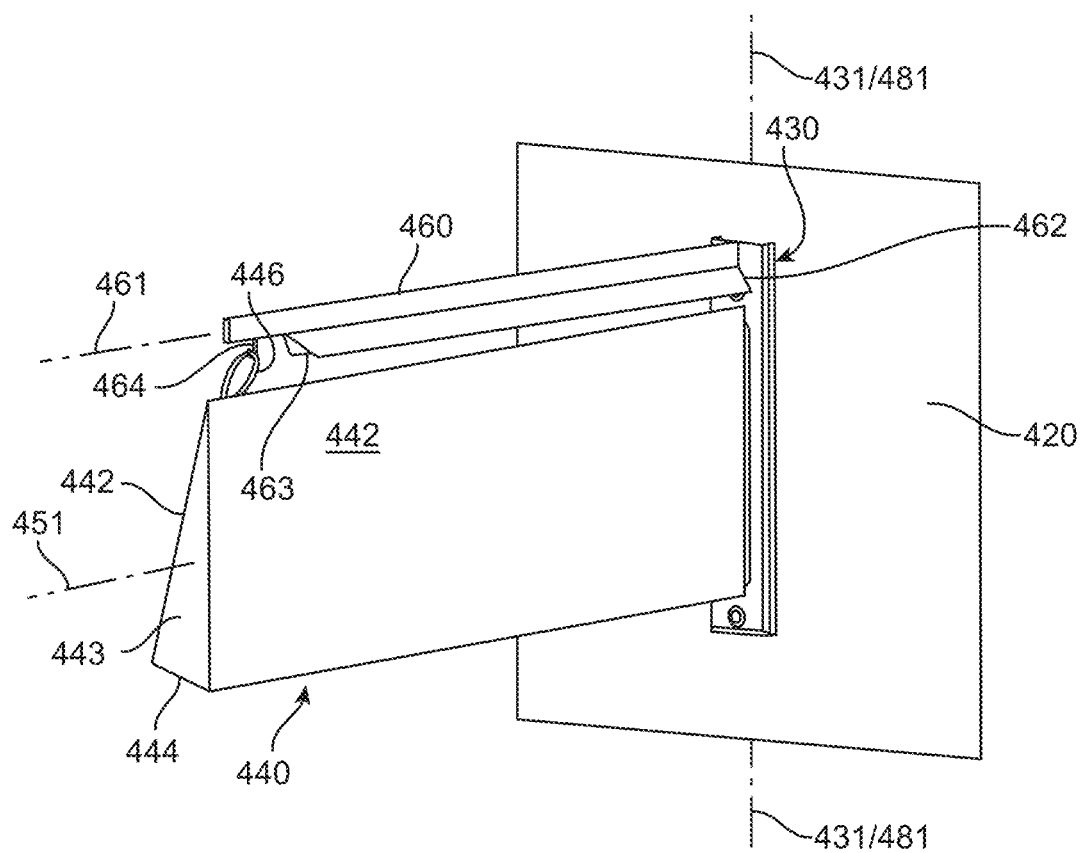
FIG. 17A is a perspective view of a portion of a tubesheet, with one illustrative embodiment of a filter bag assembly supported on one illustrative embodiment of a filter guide as described herein.

FIG. 17A is a perspective view of a portion of the tubesheet 420, with the illustrative embodiment of a filter bag assembly including a filter bag 440 supported on the illustrative embodiment of filter guide 460. As discussed herein, the filter bag assembly, including flange assembly 430 and filter bag 440 are supported on the filter guide 460, with the flange assembly 430 forming a seal with the tubesheet 420.

In one or more embodiments of the filter bags and filter systems described herein, a bag support may be provided proximate the second end of the filter bag, i.e., the closed end of the filter bag distal from the flange assembly, with the bag support configured to prevent or limit sagging of the filter bag assembly at the second end of the filter bag due to, e.g., the weight of the cage located in the filter bag. In one or more embodiments of the filter bags, filter bag assemblies, and/or filter systems described herein, the bag support may be provided on filter bag itself, as a part of the filter system, and/or include components provided as a part of the filter bag and as a part of the filter system.

The filter bag assembly depicted in FIG. 17A includes one illustrative embodiment of a bag support in the form of a bag support connector 446 attached to the filter bag 440 proximate the second (closed) end 443 of the filter bag 440 and a chamber connector 464 that is positioned in the dirty air chamber proximate the access panel 419 of the housing. In the depicted embodiment the chamber connector 464 is located on the filter guide 460 although such positioning is not required. The bag support connector 446 and the chamber connector 464 are configured to interlock with each other to support the second end of the filter bag 440 in the dirty air chamber (with the first end of the filter bag 440 being supported by the flange assembly 430 in cooperation with the filter guide 460 as described herein).

In the embodiment of a bag support as depicted in FIG. 17A, the bag support connector 446 is in the form of a loop while the chamber connector 464 is in the form of a hook, with the loop 446 connecting to the hook 464 to support the second end 443 of the filter bag 440. Many variations are, of course possible. For example, the bag support connector 446 on the filter bag 440 may be in the form of a hook while the chamber connector 464 is in the form of a loop or aperture configured to receive the hook.

Figure 17B:
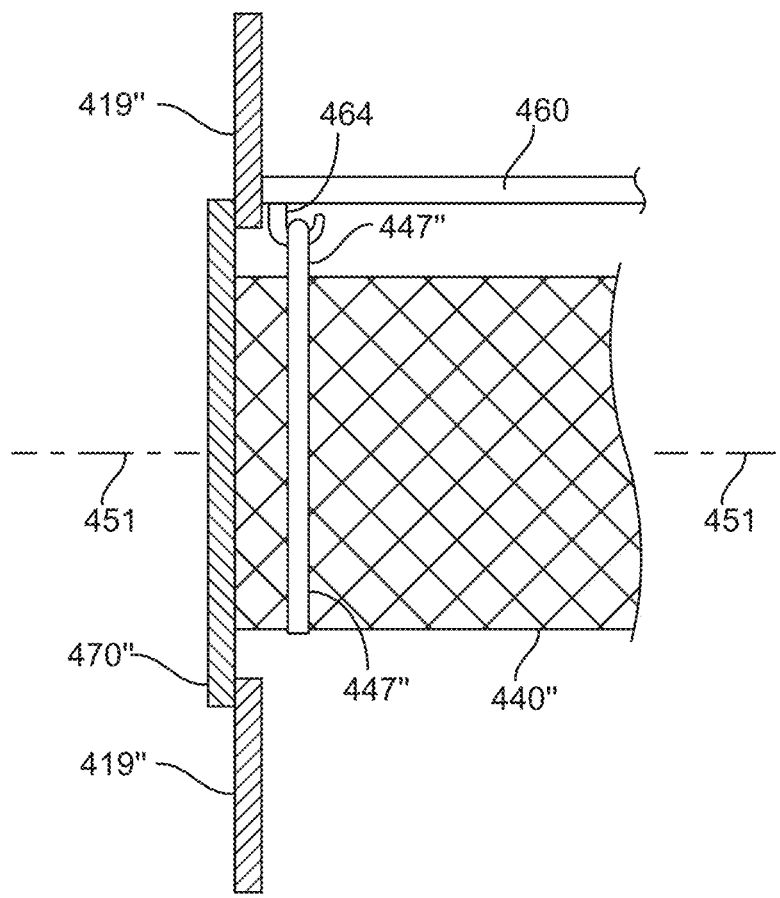
FIG. 17B depicts one alternative embodiment of a bag support that may be provided in one of more embodiments of filter systems and filter bags as described herein.

FIG. 17B depicts one alternative embodiment of a bag support that may be used to prevent or limit sagging of a filter bag assembly at the second end of the filter bag. In the depicted embodiment, the bag support includes the chamber connector 464 on filter guide 460 similar to that depicted in FIG. 17A which, in the depicted embodiment, is attached to access panel 419″ (with cover 470″ closing the access opening in the access panel 419″ as described herein). The embodiment of a bag support depicted in FIG. 17B includes a sling 447″ that may, for example wrap around the bag 440″, with the sling 447″ forming a loop that is configured to connect to the hook 464 on filter guide 460. In one or more embodiments, the sling 447″ may be attached to the filter bag 440″ using one or more of, e.g., sewing, adhesives, etc. such that the sling 447″ is replaced with the filter bag 440″. Alternatively, the sling 447″ may be separate, e.g., unattached, to the filter bag 440″ such that the sling 447″ can be re-used with two or more different filter bags 440″.

Figure 17C:
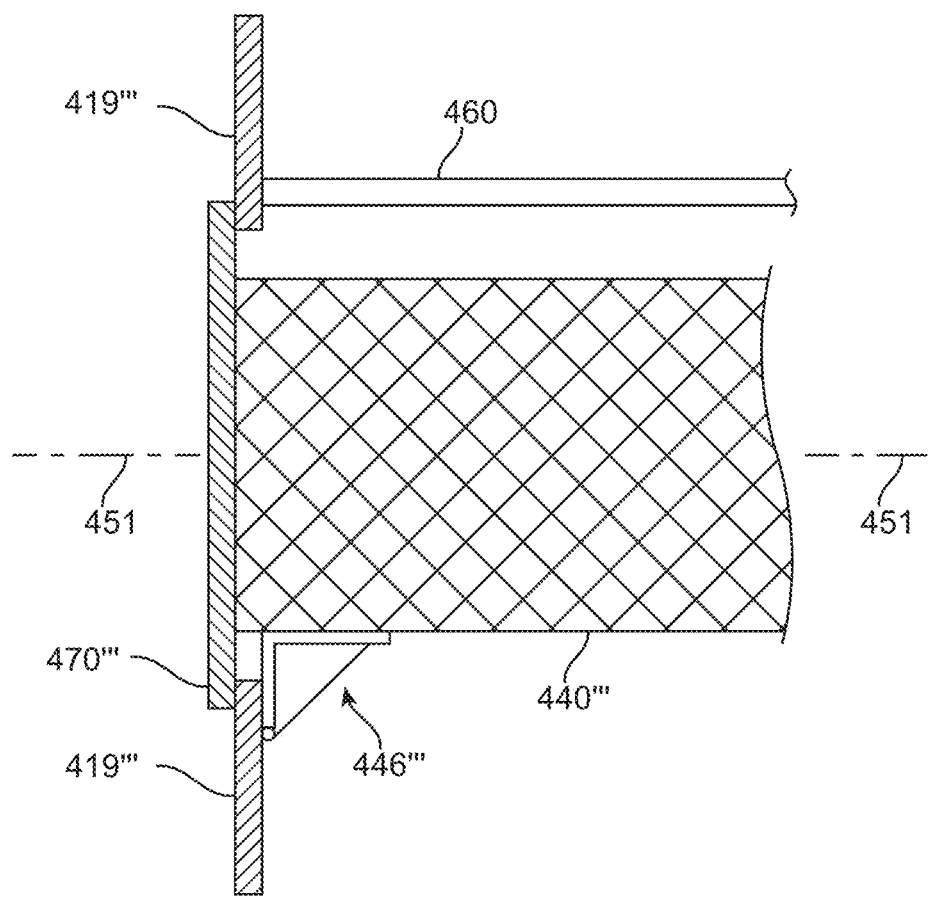
FIG. 17C depicts another alternative embodiment of a bag support that may be provided in one of more embodiments of filter systems and filter bags as described herein.

FIG. 17C depicts yet another alternative embodiment of a bag support that may be used to prevent or limit sagging of a filter bag assembly at the second (closed) end of a filter bag. In the depicted embodiment, the bag support 446‴ is in the form of a surface provided proximate the bottom of the filter bag 440‴ at the second end of the filter bag 440‴. The bag support 446‴ may be attached to the access panel 419‴ and may be accessed through the opening in the access panel 419‴ that is closed by cover 470‴. In one or more embodiments, the bag support 446‴ may be moved downward (away from the bag axis 451) to assist with replacement of the filter bag 440‴. Movement of the bag support 446‴ may include one or both of translational and rotational movement of the bag support 446″.

Figure 18A:
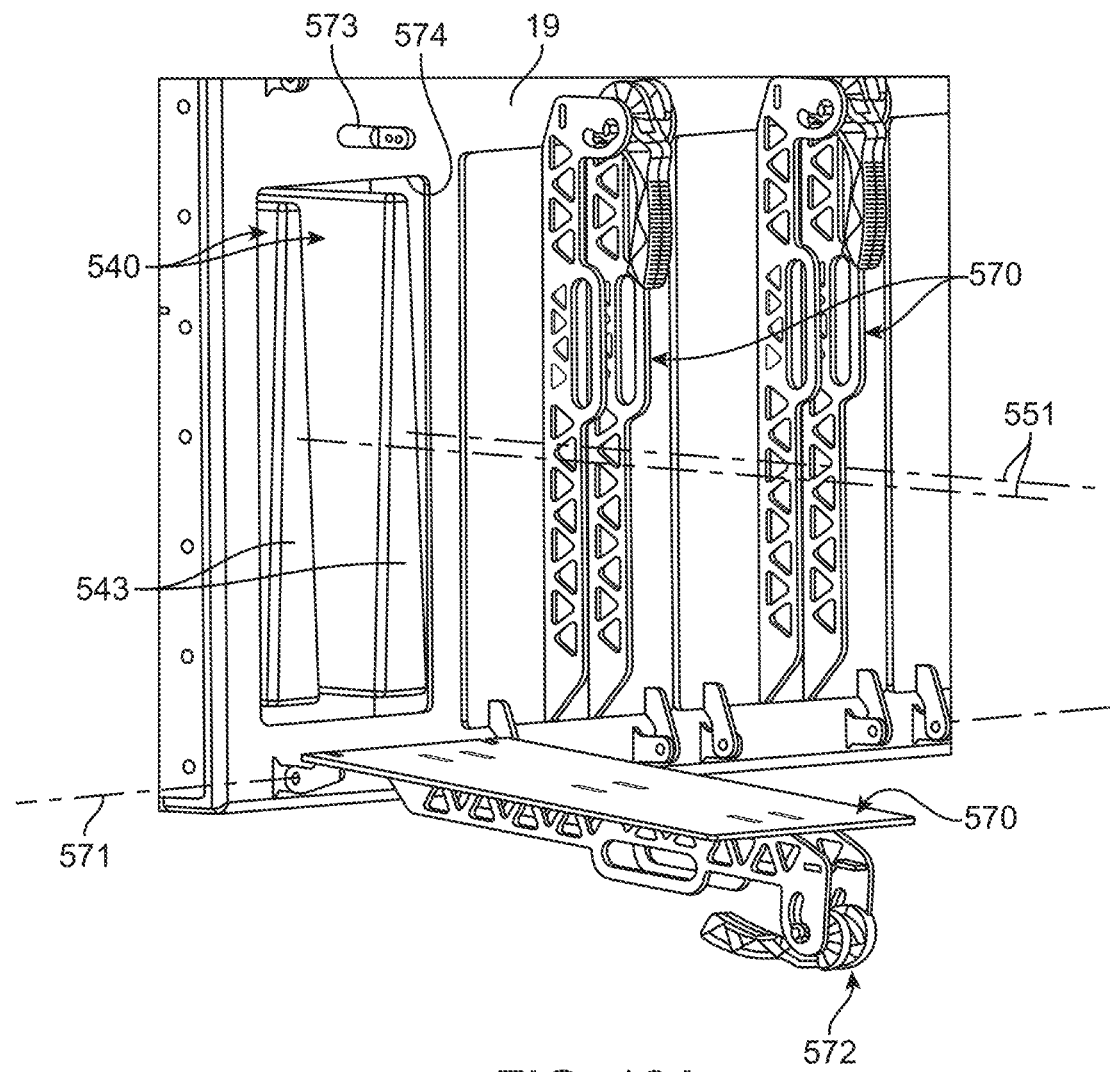
FIG. 18A is a perspective view of one illustrative embodiment of a portion of an access panel including one illustrative embodiment of covers used to close access ports through which filter bag assemblies of filter systems are passed during removal and replacement.

FIG. 18A is a perspective view of one illustrative embodiment of a portion of a access panel 419 including one illustrative embodiment of a cover 570 used to close a filter access port 574 formed in the access panel 19 through which filter bag assemblies including filter bags 540 can be removed from and inserted into the dirty air chamber of a filter system. The illustrative embodiment of cover 570 includes a latch 572 and catch 573 to secure the cover 570 in a closed position (see the covers 570 to the right of the open cover 570). The covers 570 may be connected to the access panel 19 for rotation about a hinge axis 571 such that the covers 570 can be moved from a closed position to an open position in which filter bag assemblies can be inserted into or removed from the dirty air chamber through access port 574.

Rotation of the cover 570 about hinge axis 571 moves the cover 570 to its closed position in which cover 570 covers filter access port 574. When in the closed position, the cover 570 may, in addition to closing filter access port 574, function as a seal actuator such that the cover 570 also acts on the second ends 543 of the filter bags 540 to force an attached flange assembly against a tubesheet to form a seal as described herein. The forces provided by the cover 571 acting as a seal actuator when closed may be described as acting along the cage axes 551.

Figure 18B:
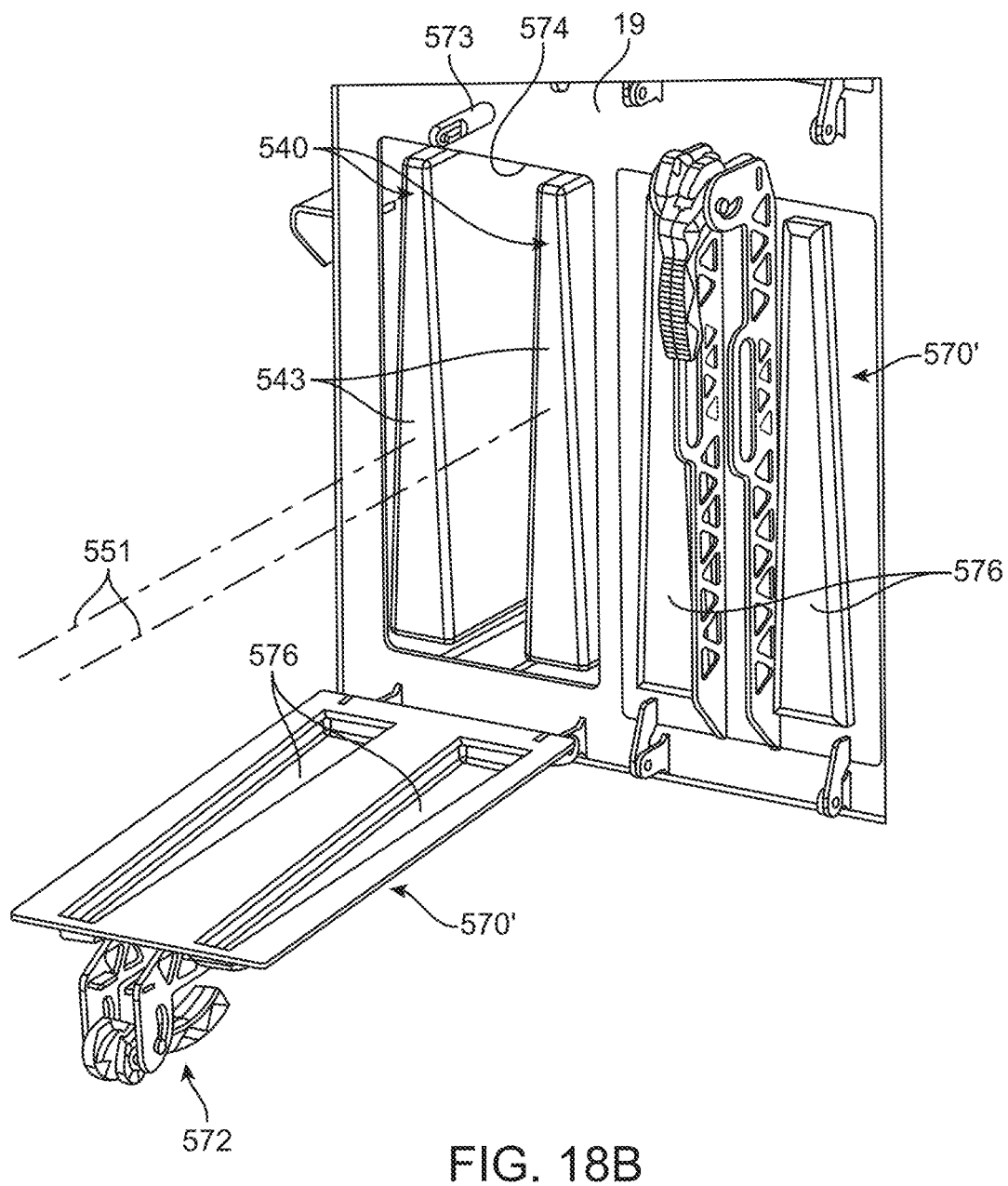
FIG. 18B is a perspective view of alternative illustrative embodiments of a portion of an access panel and covers used to close access ports, with the covers including embossments shaped to complement the filter bag assemblies.

FIG. 18B is a perspective view of the access panel 19 of FIG. 18A including an alternative illustrative embodiment of a cover 570' used to close a filter access port 574 formed in the access panel 19 through which filter bag assemblies including filter bags 540 can be removed from and inserted into the dirty air chamber of the filter system including access panel 19. This illustrative embodiment of cover 570' also includes a latch 572 and catch 573 to secure the cover 570' in a closed position (see the cover 570' to the right of the open cover 570'). The covers 570' may also be connected to the access panel 19 for rotation about a hinge axis 571 such that the covers 570' can be moved from a closed position to an open position in which filter bag assemblies can be inserted into or removed from the dirty air chamber through access port 574.

Rotation of the covers 570' about hinge axis 571 moves the covers 570' to their closed positions in which covers 570' close filter access port 574. When in the closed position, the covers 570' may, in addition to closing filter access port 574, function as seal actuators such that the covers 570' also act on the second ends 543 of the filter bags 540 to force an attached flange assembly against a tubesheet to form a seal as described herein. The forces provided by the covers 570' acting as seal actuators when closed may be described as acting along the cage axes 551.

An additional feature depicted in covers 570' are the embossments (cavities) 576 provided in covers 570'. The embossments 576 may, in one or more embodiments, have shapes that are complementary to the shape of the ends 543 of the filter bags 540. Such embossments may provide advantages such as, for example, additional stability to the filter bag assemblies proximate the access panel 19, more uniform force distribution over the second ends 543 of the filter bags 540 and, therefore, over the cages located within the filter bags 540 in filter bag assemblies as described herein, verification of proper installation of the filter bag assemblies (such that, for example, the bottom surfaces of triangular filter bags are properly oriented in a dirty air chamber), etc. In embodiments that include such embossments, a bag support configured to support the second end of the filter bag (as discussed above in connection with, e.g., FIGS. 17A-17C) may be helpful in ensuring that the second ends 543 of the filter bags 540 are properly positioned as the covers 570' are closed.

As discussed herein, the filter bags used in the filter bag assemblies of filter systems described herein are made of generally flexible filter media, the filter bags may not form particularly distinct triangles when viewed in cross-section. In general, however, the triangular-shaped filter bags and their associated cages can be described using the geometry of triangles with an understanding that the edges, sides, and vertices of such triangles will be generally approximated by the triangular cages and filter bags fitted thereon.

With that understanding, reference is made to FIGS. 23-26 in which various triangular-shaped bag constructions that may be used in one or more embodiments of filter bag assemblies and filter systems using the filter bag assemblies as described herein.

Figure 19:
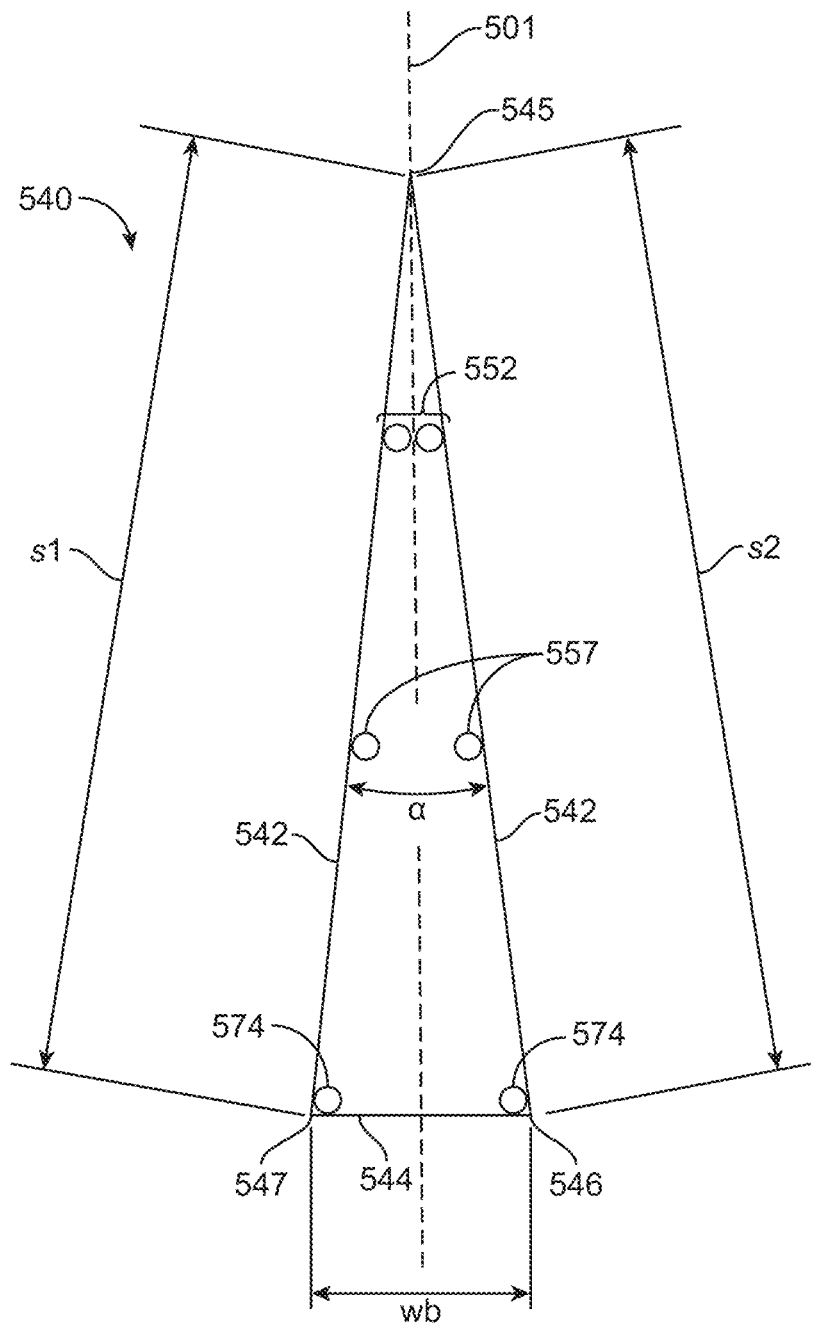
FIG. 19 is a diagram of one illustrative embodiment of a triangle formed by one illustrative embodiment of a filter bag used in a filter system as described herein.

The idealized triangular-shaped bag 540 depicted in FIG. 19 is, in many respects, similar to the triangular-shaped bag 440 discussed herein with respect to various embodiments of the filter bag assemblies and filter systems described above. The triangular-shaped bag 540 includes a top vertex 545 and a pair of bottom vertices 546 and 547. A pair of side surfaces 542 extend between the top vertex 545 and each of the bottom vertices 546 and 547. A bottom surface 544 extends between the bottom vertices 546 and 547.

To further illustrate the difference between an idealized triangular-shaped defined by one or more embodiments of filter bags as described herein and the actual shapes taken by filter bags located on cages that provide the triangular shapes, the struts of a one illustrative embodiment of a cage are included in FIG. 19 along with cage axis 551 (which extends perpendicularly out of the paper on which FIG. 19 is located). In particular, top struts, bottom struts, and intermediate struts 574 are depicted inside filter bag 540 in FIG. 19. It should be noted that two top struts 574 are provided. Such a construction may provide filter bag 540 with a small flat surface along its top edge. Regardless of the slight deviation from a perfect triangle, it can be seen that the side surfaces 542 and bottom surface 544 of the filter bag 540 take on a generally triangular shape as described herein.

The bottom surface 544 may be described as having a width wb extending between the bottom vertices 546 and 547. The left side surface 542 may be described as having a height s1 measured between the top vertex 545 and bottom vertex 547. The right side surface 542 may be described as having a height s2 measured between the top vertex 545 and bottom vertex 546. As discussed herein the width of the bottom surface (wb) is preferably less than the height of either of the side surfaces (s1 or s2).

Although not required, the depicted triangular-shaped bag 540 forms a triangle that may be described as being an acute triangle and, optionally, an isosceles triangle (in which s1=s2). In the case of an isosceles triangle, the axis 501 depicted in FIG. 19 may be described as being an altitude of the triangle formed by the filter bag 540.

The triangular-shaped bag 540 may further be described with respect to the angle formed by the side surfaces 542. In particular, the angle α (alpha) formed by side surfaces 542 at vertex 545 may be selected such that the width (wb) of the bottom surface 544 has a selected relationship with the heights of the side surfaces 542. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

Figures 20, 21:
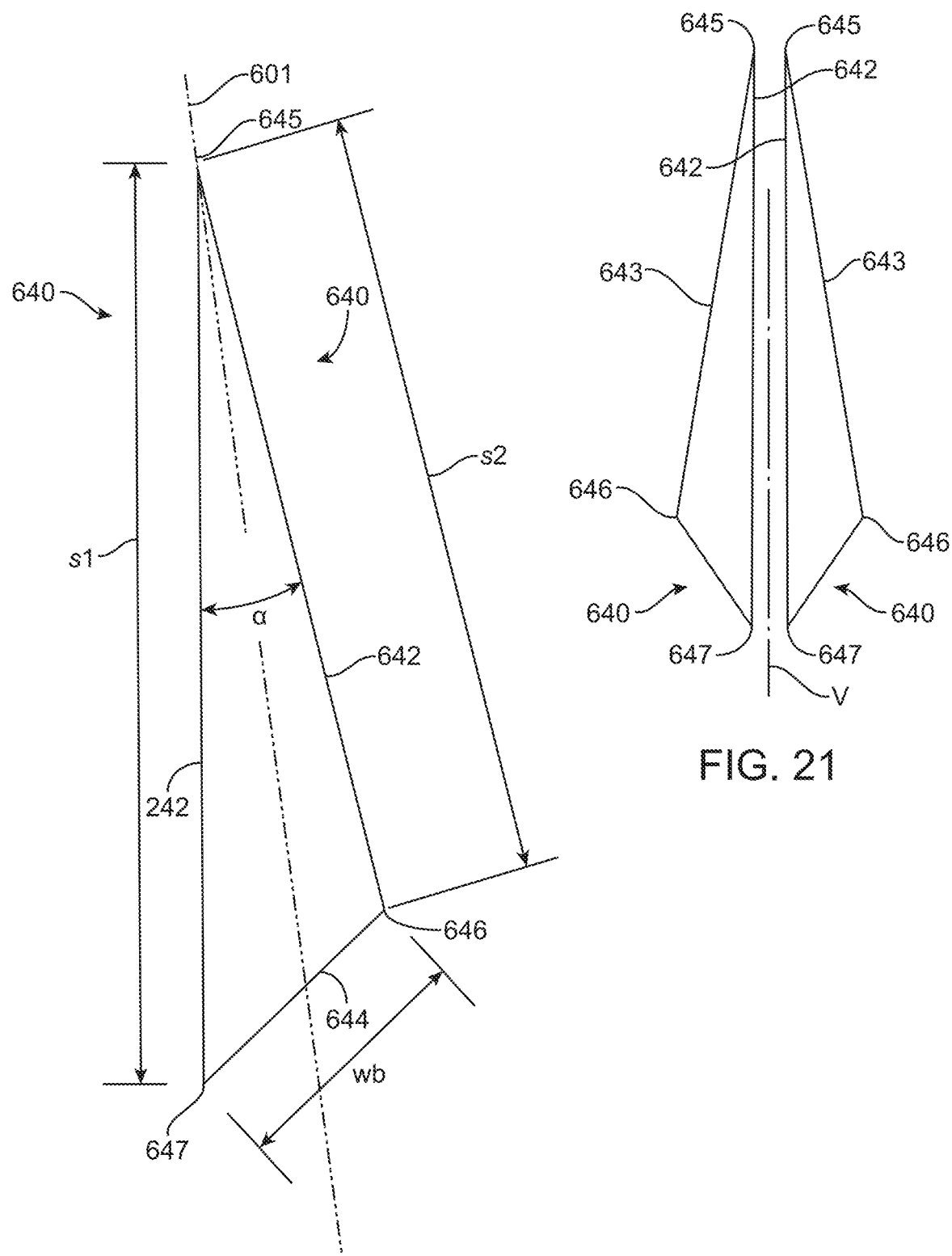
FIG. 20 is a diagram of another illustrative embodiment of a triangle formed by another illustrative embodiment of a filter bag used in a filter system as described herein.
FIG. 21 is a diagram depicting one illustrative example of a possible arrangement of a pair of filter bags as depicted in FIG. 20.

FIG. 20 depicts one alternative triangular-shaped filter bag that may be used in one or more embodiments of a filter bag assembly and/or filter system as described herein. The triangular-shaped bag 640 includes a top vertex 645 and a pair of bottom vertices 646 and 647. A pair of side surfaces 642 extend between the top vertex 645 and each of the bottom vertices 646 and 647. A bottom surface 644 extends between the bottom vertices 646 and 647. When mounted on a cage in a filter bag assembly as described herein, the cage axis would extend perpendicularly out of the paper on which FIG. 20 is located.

The bottom surface 644 may be described as having a width wb extending between the bottom vertices 646 and 647. The left side surface 642 may be described as having a height s1 measured between the top vertex 645 and bottom vertex 647. The right side surface 642 may be described as having a height s2 measured between the top vertex 645 and bottom vertex 646. As discussed herein the width of the bottom surface (wb) is preferably less than the height of either of the side surfaces (s1 or s2).

The triangular-shaped bag 640 may optionally be described with respect to the angle formed between the side surfaces 642 at vertex 645. In particular, the angle α (alpha) formed by side surfaces 642 at vertex 645 may be selected such that the width (wb) of the bottom surface 644 has a selected relationship with the heights of the side surfaces 642. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

The depicted triangular-shaped bag 640 forms a triangle that may be described as being an obtuse triangle. The axis 601 depicted in FIG. 20 may be described as bisecting the angle α (alpha) and, as a result, the axis 601 also bisects the bottom surface 644. In one or more embodiments of triangular-shaped filter bags as described herein, the axis passing through the top vertex and bisecting the angle formed at that vertex may preferably be oriented generally vertically within the dirty air chamber of a filter system. With respect to the embodiment of triangular-shaped filter bag 640, axis 601 may be oriented vertically or, alternatively, the axis 601 may canted or angled with respect to a vertical axis Although the bottom surface 644 of the triangular-shaped filter bag 640 may not be oriented transverse to the vertical axis, particulate matter dislodged from the bottom surface 644 during pulse cleaning would have a vertical force component that, when added to the force applied by gravity, would preferentially move the dislodged particulate matter downward as described in connection with other illustrative embodiments of filter bags described herein.

FIG. 21 depicts a pair of triangular-shaped filter bags 640. The triangular-shaped filter bag 640 on the right side of FIG. 21 has essentially the same shape as the filter bag 640 depicted in FIG. 20. The triangular-shaped filter bag 640 on the left side of FIG. 21 is a mirror image of the filter bag 640 on the right side of FIG. 21. Both the left and right side triangular-shaped filter bags 640 include vertically oriented surfaces 642 facing each other and aligned with a vertical axis V, while the outer side surfaces 643 of the triangular-shaped filter bags 640 face away from each other. One potential advantage of such an arrangement is that the triangular-shaped filter bags 640 may be spaced closer together (in a direction transverse to the vertical axis), thus increasing the surface area of filter media available within a given dirty air chamber volume while retaining the particulate loading and pulse cleaning advantages that may be associated with triangular-shaped filter bags as described herein.

Figure 22:
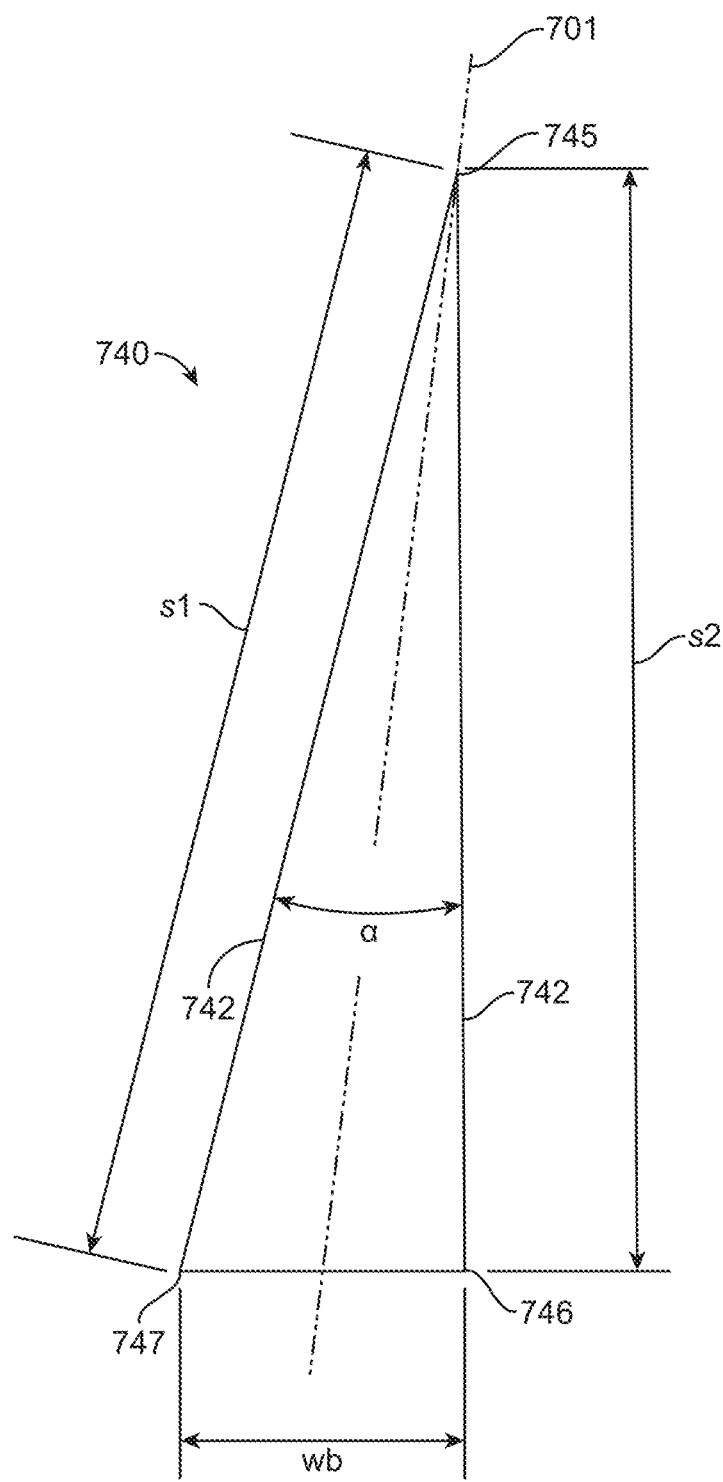
FIG. 22 is a diagram of another illustrative embodiment of a triangle formed by another illustrative embodiment of a filter bag used in an air filter system as described herein.

FIG. 22 depicts another alternative triangular-shaped filter bag that may be used in one or more embodiments of a filter bag assembly and/or filter system as described herein. The triangular-shaped bag 740 includes a top vertex 745 and a pair of bottom vertices 746 and 747. A pair of side surfaces 742 extend between the top vertex 745 and each of the bottom vertices 746 and 747. A bottom surface 744 extends between the bottom vertices 746 and 747. When mounted on a cage in a filter bag assembly as described herein, the cage axis would extend perpendicularly out of the paper on which FIG. 22 is located.

The bottom surface 744 may be described as having a width wb extending between the bottom vertices 746 and 747. The left side surface 742 may be described as having a height s1 measured between the top vertex 745 and bottom vertex 747. The right side surface 742 may be described as having a height s2 measured between the top vertex 745 and bottom vertex 746. As discussed herein the width of the bottom surface (wb) is preferably less than the height of either of the side surfaces (s1 or s2).

The triangular-shaped bag 740 may optionally be described with respect to the angle formed between the side surfaces 742 at vertex 745. In particular, the angle α (alpha) formed by side surfaces 742 at vertex 745 may be selected such that the width (wb) of the bottom surface 744 has a selected relationship with the heights of the side surfaces 742. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

The depicted triangular-shaped bag 740 forms a triangle that may be described as being a right triangle. The axis 701 depicted in FIG. 22 may be described as bisecting the bottom surface 744. In one or more embodiments of triangular-shaped filter bags as described herein, the axis passing through the top vertex and bisecting the bottom surface may be oriented generally vertically within the dirty air chamber of a filter system. With respect to the embodiment of triangular-shaped filter bag 740, axis 701 may be oriented vertically or, alternatively, the right side surface 742 (forming a right angle with the bottom surface 744) may be oriented vertically such that the bottom surface 744 is oriented generally horizontally to a vertical axis. As used herein, the phrase "generally horizontal" (and variations thereof) means that the component or components (e.g., a filter bag and/or filter bag assembly with cage) is/are arranged such that the component or components form an angle of 45 degrees or less, 30 degrees or less, 20 degrees or less, or 15 degrees or less off of a horizontal line (where gravitational force vectors define the vertical axis). For example, the cage axis or filter bag axis may define such an angle with a horizontal line if the filter bag and/or cage is canted with respect to perfectly horizontal line.

Even if the bottom surface 744 of the triangular-shaped filter bag 740 is not oriented transverse to the vertical axis (where, for example, the axis 701 is oriented vertically), particulate matter dislodged from the bottom surface 744 during pulse cleaning would have a vertical force component that, when added to the force applied by gravity, would preferentially move the dislodged particulate matter downward as described in connection with other illustrative embodiments of filter bags described herein.

Figure 23:
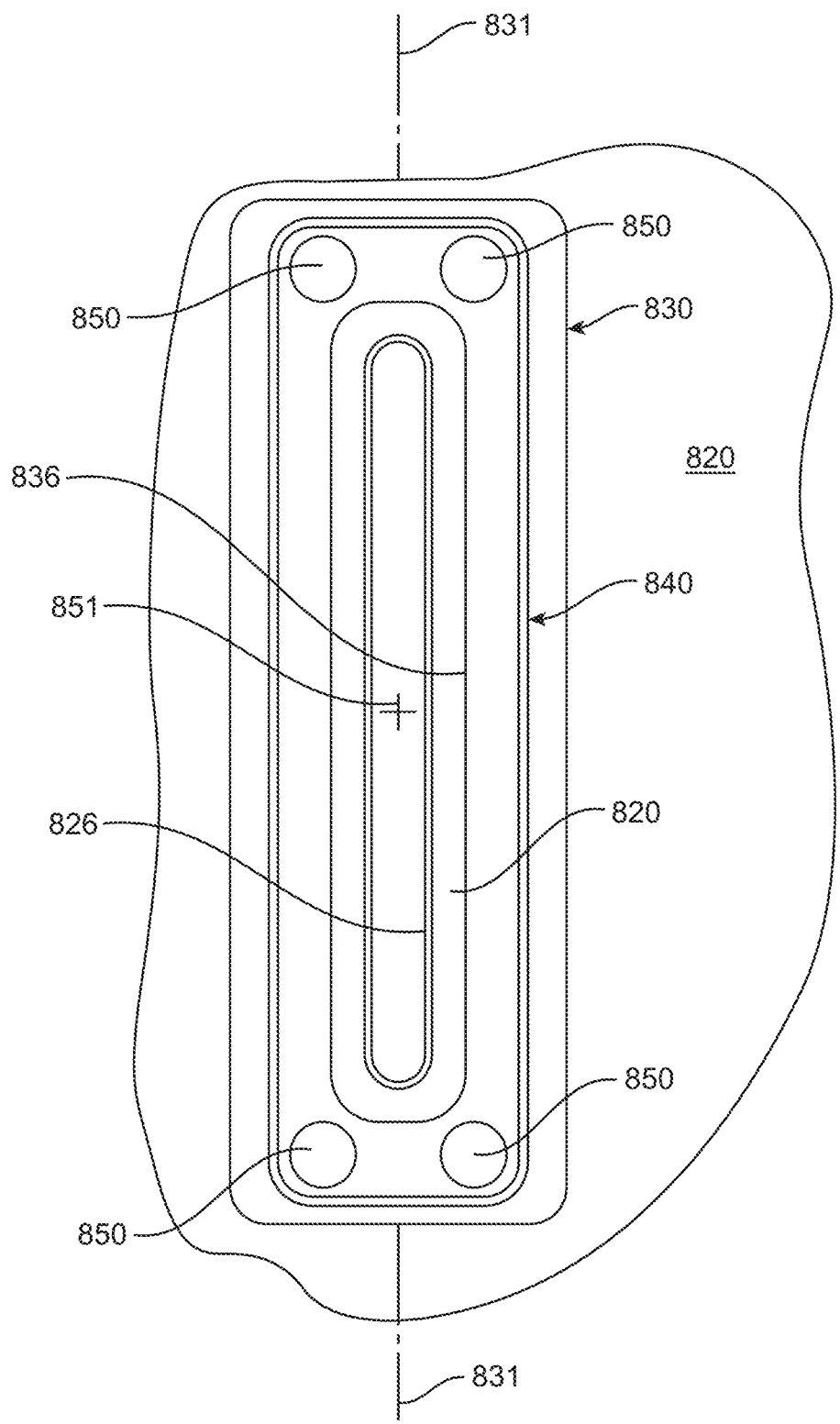
FIG. 23 is a cross-sectional view of another illustrative embodiment of a filter bag assembly including an envelope-shaped filter bag supported by a cage on a flange assembly as described herein.

FIG. 23 is a cross-sectional view of another illustrative embodiment of a filter bag assembly including an envelope-shaped filter bag 840 supported by a cage 850 on a flange assembly 830 as described herein. Although some illustrative embodiments of filter systems and filter bag assemblies described herein may advantageously use filter bags and cages that result in triangularly shaped filter bags, many of the advantages and benefits associated with filter bag assemblies that are compressed within a dirty air chamber as described herein are also available in connection with filter bags on filter bag assemblies having any selected shape.

In particular, FIG. 23 depicts one embodiment of a more conventional envelope-shaped filter bag assembly in which the opposite major sides of the filter bag 840 are generally parallel to each other in use (e.g., have an angle α (alpha) that is essentially 0° (with reference to FIGS. 23-26)). The filter bag 840 is mounted on a cage constructed of struts 850 that define the envelope shape of the filter bag 840 mounted thereon.

The struts 850 are attached to a flange assembly 830 that includes a clean air outlet 836 as described in connection with other embodiments of flange assemblies of filter bag assemblies as described herein. The clean air outlet 836 is, in the depicted illustrative embodiment elongated along an outlet axis 831 as described in connection with other illustrative embodiments herein.

The struts 850 of the cage attached to the flange assembly 830 also extend away from that flange assembly 830 along a cage axis 851 to a distal end where they support a second end of the filter bag 840 as described in connection with other illustrative embodiments herein. Also depicted in FIG. 23 are a portion of the tubesheet 820 against which flange assembly 830 is forced to provide a seal, along with an aperture 826 in the tubesheet 820 through which air passes into or out of the clean air chamber located on the opposite side of the tubesheet 820.

FIGS. 28-30 depict one illustrative embodiment of a triangular filter bag that may be used in one or more embodiments of filter bag assemblies and filter systems as described herein. The triangular filter bag 940 includes an opening 943, a closed end provided by a substantially triangular end cap 990, and a body 980 extending from the opening 943 to the closed end along a bag axis 941 that extends between the opening 943 to the closed end of the filter bag 940.

The body 980 of the triangular filter bag 940 is formed of filter media suitable for removing particulate matter from air in the application for which it is intended. In one or more embodiments, the body 980 may consist essentially of filter media with no other components provided. With reference to FIG. 25, the body 980 may include seam edges 982 and 983 that are attached to each other to form a longitudinal seam 982/983 as seen in, e.g., FIG. 24. When the seam edges 982/983 are attached to each other, the body may be described as taking a tubular shape that defines an interior volume between the opening 943 and the closed and defined by the triangular end cap 990. In that tubular shape, the filter media of the body 980 also defines a closed end edge 984 located at the closed end of the filter bag 940 and an opening edge 985 located at the opening 943 of the filter bag 940.

In one or more embodiments, the junction between the longitudinal seam 982/983 with the triangular end cap 990 may be located along one of the side edges 992 of the triangular end cap 990 between the bottom edge 994 and the apex 995 of the triangular end cap. In one or more alternative embodiments, a junction between a longitudinal seam and a triangular end cap of a filter bag as described herein may be located along the bottom edge 994 or the apex 995. Further, although body 980 includes only one longitudinal seam 982/983, one or more alternative embodiments of triangular filter bags as described herein may include two or more seams.

The triangular end cap of one or more embodiments of triangular filter bags as described herein may, with reference to the illustrative embodiment of triangular end cap 990, include two side edges 992 that extend between a bottom edge 994 and an apex 995. Described alternately, the side edges 992 of the triangular end cap 990 may be described as meeting at the apex 995 at a location distal from the bottom edge 994.

To provide a filter bag capable of removing particulate matter from air, the filter media of the body 980 at the closed end edge 984 is sealed to the side edges 992, bottom edge 994 and apex 995 of the triangular end cap 990 such that particulate matter is substantially prevented from passing through those junctions.

Figure 26:
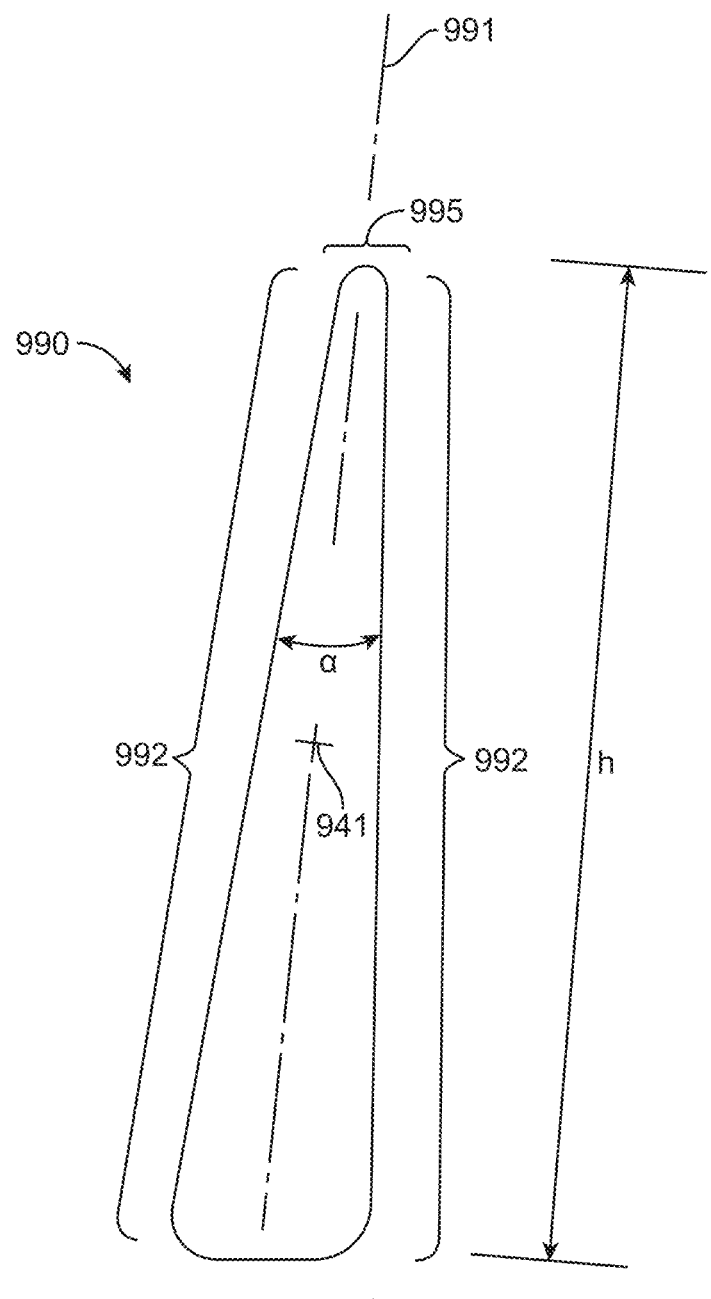
FIG. 26 is a schematic diagram illustrating relationships between the features of the illustrative embodiment of the triangular end cap depicted in FIGS. 24-25.

The triangular end cap 990 may, in one or more embodiments, define the generally triangular-shaped of the filter bag 940 along its length and will more definitely define the triangular-shape of the filter bag 940 proximate the triangular end cap 990. With reference to FIG. 26, the shape of the triangular end cap 990 can be described with reference to the included angle formed between the side edges 992 of the triangular end cap 990. In particular, the bottom edge 994, apex 995, and side edges 992 of the triangular end cap 990 may, in one or more embodiments, be described as defining an included angle α (alpha) between the side edges 992 at the apex 995 of 20° or less, 15° or less, 12° or less, 10° or less, or 5° or less. At a lower end, the angle α (alpha) may be, in one or more embodiments, 2° or more, 3° or more, 4° or more, or 5° or more.

The triangular end caps that may be used in one or more embodiments of triangular filter bags as described herein may alternatively be described with respect to the dimensions of the features of the triangular end cap. For example, the triangular end cap 990, when projected onto a flat surface along the bag axis 941 may, in one or more embodiments, define a height (h) between the apex 995 and the bottom edge 994. The projection of triangular end cap 990 may also define a width (w) across the bottom edge 994 between the side edges 992. In one or more embodiments of triangular filter bags as described herein, the height (h) is greater than the width (w). More particularly, in one or more embodiments, the height (h) defined between the bottom edge and the apex of a triangular end cap may be 4 or more, 6 or more, 8 or more, 10 or more, 12 or more, or 15 times or more the width (w) defined along the bottom edge between the sides of the triangular end. In one or more embodiments, the height (h) defined between the bottom edge and the apex of a triangular end cap may be, at an upper end, 20 or less, 15 or less, 12 or less, 10 or less, 8 or less, or 6 or less times the width (w) defined along the bottom edge between the sides of the triangular end. In one embodiment, the height (h) defined between the bottom edge and the apex of a triangular end cap may be 7 to 8 times the width (w) defined along the bottom edge between the sides of the triangular end. It should be noted that the height (h) is preferably measured along an end cap axis 991 that extends between the bottom edge 994 and the apex 995 and may, in one or more embodiments, be described as bisecting both the bottom edge 994 and the apex 995 and/or defining an axis of symmetry of the triangular end 990. In one or more embodiments of filter bags including triangular end caps as described herein, the triangular end cap may be constructed of filter media, e.g., the same filter media used for the body 980 of the filter bag. In one or more alternative embodiments, the triangular end caps may be constructed of materials that are impermeable to air (unlike the filter media used for the body 980). In one or more embodiments, the triangular end caps may be substantially rigid, self-supporting articles, while in other embodiments the triangle are end caps may be constructed of flexible materials that are not capable of self-support.

In one or more embodiments of filter bags including triangular end caps as described herein, the closed end edge 984 of the body 980 may be sealed to the side edges 992 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 984 of the body 980 may be sealed to the bottom edge 994 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 984 of the body 980 may be sealed to the apex 995 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

Figure 24:
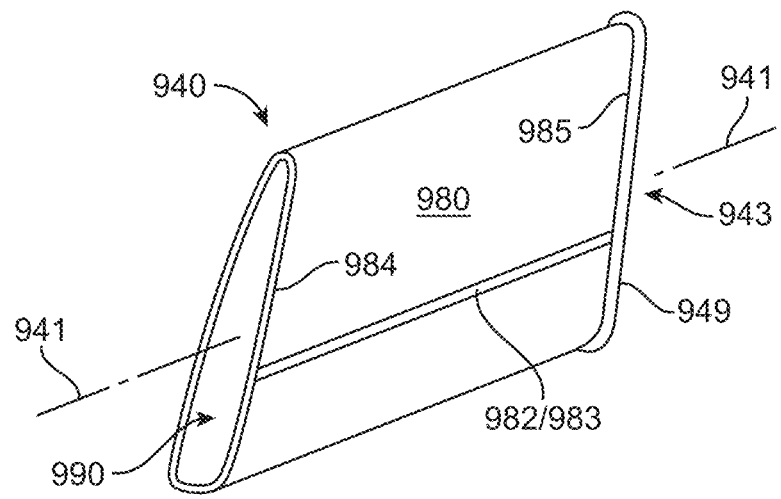
FIG. 24 is a perspective view of one illustrative embodiment of a triangular filter bag that may be used in one or more embodiments of the filter bag assemblies air filter systems described herein.
Figure 25:
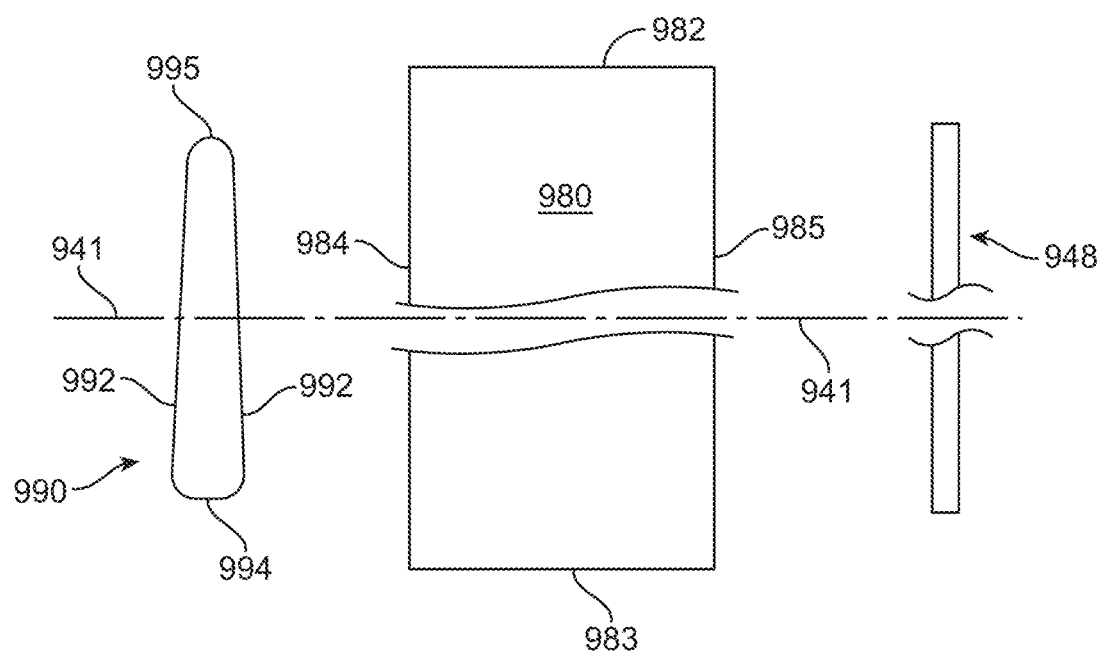
FIG. 25 depicts components that may be used to construct the illustrative embodiment of the triangular filter bag depicted in FIG. 24.

With reference to FIG. 24, filter bag 940 also includes a sealing cuff 949 attached to the filter media of the body 980 proximate the open edge 985 of the body 980. The cuff 949 may, in one or more embodiments, be used to seal the bag opening 943 in a flange assembly of a filter bag assembly as described herein.

Illustrative Aspects

Following are illustrative aspects of the filter bags, filter bag support assemblies, filter bag assemblies, air filter systems, and methods described herein.

In independent aspect A1, a filter bag as described herein comprises a tubular body formed of filter media configured to remove particulate matter from air passing through the filter media, the tubular body extending from a closed end to a bag opening along a bag axis coincident with a central axis of the tubular body, wherein a sealing cuff extends around a perimeter of the bag opening, and wherein a reference bag length measured along the bag axis between a reference plane oriented perpendicular to the bag axis and the bag opening changes when moving around the perimeter of the bag opening.

In aspect A2 according to aspect A1, the reference bag length comprises a minimum reference bag length at a first location on the perimeter of the bag opening and a maximum reference bag length at a second location on the perimeter of the bag opening.

In aspect A3 according to aspect A2, a rate of change in the reference bag length between the first location and the second location is substantially linear.

In aspect A4 according to any one of aspects A2 to A3, a distance between the first location and the second location is equal when moving clockwise and counterclockwise along the perimeter of the bag opening from the first location to the second location.

In aspect A5 according to any one of aspects A2 to A4, the perimeter of the bag opening defines a bag opening plane and the bag opening plane defines an angle with reference plane, wherein the angle defined between the bag opening plane and the reference plane is 15 degrees or more, 20 degrees or more, 25 degrees or more, 30 degrees or more, 35 degrees or more, 40 degrees or more, or 45 degrees or more, and, optionally, wherein the angle defined between the bag opening plane and the reference plane is 60 degrees or less, 55 degrees or less, 50 degrees or less, 45 degrees or less, 40 degrees or less, 35 degrees or less, 30 degrees or less, 25 degrees or less, or 20 degrees or less, and further optionally, wherein the angle defined between the bag opening plane and the reference plane is within a range of 15 degrees to 45 degrees, or, alternatively, 20 degrees to 40 degrees.

In aspect A6 according to any one of aspects A1 to A5, the reference bag length changes continuously over at least a majority of the perimeter of the bag opening.

In aspect A7 according to any one of aspects A1 to A5, the reference bag length changes continuously over the entire perimeter of the bag opening.

In aspect A8 according to any one of aspects A1 to A7, a bag opening perimeter length measured around the perimeter of the bag opening is greater than a body perimeter length measured in a reference plane oriented perpendicular to the bag axis at a location between the bag opening and the closed end.

In aspect A9 according to any one of aspects A1 to A8, the filter bag comprises a bag support connector attached to the body proximate the closed end of the body, the bag support located outside of an interior volume of the body.

In aspect A10 according to aspect A9, the bag support connector comprises an aperture configured to receive a hook.

In independent aspect B1, a filter bag support assembly comprises: a flange assembly comprising an interior face and a tubesheet face, the flange assembly comprising a clean air outlet extending through the flange assembly; and a cage comprising a first cage end attached to the flange assembly, the cage extending away from the interior face of the flange assembly over a cage length to a second cage end distal from the base, the cage defining a cage axis extending between the first cage end and the second cage end; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture, the bag seal surface facing the clamp, wherein the clamp comprises a clamp seal surface surrounding the clamp aperture, the clamp seal surface facing the bag seal surface when the clamp is attached to the base, and wherein the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

In aspect B2 according to aspect B1, the tubesheet seal surface defines a tubesheet seal plane and wherein the cage axis is generally normal to the tubesheet seal plane.

In aspect B3 according to any one of aspects B1 to B2, the second cage end defines a second cage end plane generally normal to the cage axis.

In aspect B4 according to any one of aspects B1 to B3, the cage comprises a plurality of struts attached to the base.

In aspect B5 according to aspect B4, the plurality of struts are attached to the base between the base aperture and the bag seal surface.

In aspect B6 according to aspect B4, the plurality of struts are attached to the base between the tubesheet face aperture and the tubesheet seal surface.

In aspect B7 according to any one of aspects B4 to B6, the plurality of struts attached to the base are aligned with the cage axis between the first cage end and the second cage end.

In aspect B8 according to any one of aspects B1 to B7, the base aperture and the clamp aperture are each elongated such that they each define a major axis and a minor axis oriented perpendicular to the major axis, wherein the major axis is greater than the minor axis, and wherein, optionally, wherein the major axis is greater than the minor axis by a factor of 2 or more, 3 or more, or 4 or more.

In aspect B9 according to aspect B8, the cage comprises a first strut attached to the base proximate a first end of the base aperture on the major axis and a second strut attached to the base proximate a second end of the base aperture on the major axis, wherein the first strut comprises a first strut length between the base and the second cage end that is greater than a second strut length between the base and the second cage end.

In aspect B10 according to any one of aspects B1 to B9, the distance between the bag seal surface and the tubesheet seal surface in a direction aligned with the cage axis changes continuously when moving around a perimeter of the base aperture.

In aspect B11 according to any one of aspects B1 to B10, the filter bag support assembly comprising a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect B12 according to aspect B11, when the clean air outlet is elongated such that the clean air outlet defines a maximum height along a major axis and a maximum width less than the maximum height along a minor axis transverse to the major axis, the guide aperture is located along the major axis.

In aspect B13 according to any one of aspects B11 to B12, the guide aperture is formed in only one of the base and the clamp of the flange assembly.

In aspect B14 according to any one of aspects B11 to B13, the guide aperture is formed in the clamp of the flange assembly.

In independent aspect C1, a filter bag support assembly comprises a flange assembly comprising an interior face and a tubesheet face, the flange assembly comprising a clean air outlet extending through the flange assembly; and a cage comprising a first cage end attached to the flange assembly, the cage extending away from the interior face of the flange assembly over a cage length to a second cage end distal from the base, the cage defining a cage axis extending between the first cage end and the second cage end; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture, the bag seal surface facing the clamp, wherein the clamp comprises a clamp seal surface surrounding the clamp aperture, the clamp seal surface facing the bag seal surface when the clamp is attached to the base, wherein, when the clamp is attached to the base, the bag seal surface and the clamp seal surface define a bag seal plane, wherein the cage axis is not normal to the bag seal plane.

In aspect C2 according to aspect C1, the cage axis forms an angle of 85 degrees or less, 80 degrees or less, 75 degrees or less, or 70 degrees or less with the bag seal plane, and, optionally, wherein the angle is 50 degrees or more, 55 degrees or more, 60 degrees or more, 65 degrees or more, 70 degrees or more, 75 degrees or more, 80 degrees or more, or 85 degrees or more.

In aspect C3 according to any one of aspects C1 to C2, the second cage end defines a second cage end plane generally normal to the cage axis.

In aspect C4 according to any one of aspects C1 to C3, the cage comprises a plurality of struts attached to the base, wherein the plurality of struts are attached to the base between the base aperture and the bag seal surface.

In aspect C5 according to aspect C4, the plurality of struts attached to the base are aligned with the cage axis between the first cage end and the second cage end.

In aspect C6 according to any one of aspects C1 to C5, the base aperture and the clamp aperture are each elongated such that they each define a major axis and a minor axis oriented perpendicular to the major axis, wherein the major axis is greater than the minor axis, and wherein, optionally, wherein the major axis is greater than the minor axis by a factor of 2 or more, 3 or more, or 4 or more.

In aspect C7 according to aspect C6, the cage comprises a first strut attached to the base proximate a first end of the base aperture on the major axis and a second strut attached to the base proximate a second end of the base aperture on the major axis, wherein the first strut comprises a first strut length between the base and the second cage end that is greater than a second strut length between the base and the second cage end.

In aspect C8 according to any one of aspects C1 to C7, the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, and wherein the tubesheet seal surface defines a tubesheet seal plane, wherein the cage axis is oriented generally normal to the tubesheet plane.

In aspect C9 according to aspect C8, the tubesheet seal plane forms an angle of 30 degrees or less, 25 degrees or less, 20 degrees or less, 15 degrees or less, 10 degrees or less, or 5 degrees or less with the bag seal plane, and, optionally, wherein the angle formed between the tubesheet seal plane and the bag seal plane is 5 degrees or more, 10 degrees or more, 15 degrees or more, 20 degrees or more, or 25 degrees or more.

In aspect C10 according to any one of aspects C1 to C7, the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

In aspect C11 according to aspect C10, the distance between the bag seal surface and the tubesheet seal surface in a direction aligned with the cage axis changes continuously when moving around a perimeter of the base aperture.

In aspect C12 according to any one of aspects C1 to C11, the filter bag support assembly comprises a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect C13 according to aspect C12, when the clean air outlet is elongated such that the clean air outlet defines a maximum height along a major axis and a maximum width less than the maximum height along a minor axis transverse to the major axis, the guide aperture is located along the major axis.

In aspect C14 according to any one of aspects C12 to C13, the guide aperture is formed in only one of the base and the clamp of the flange assembly.

In aspect C15 according to any one of aspects C12 to C14, the guide aperture is formed in the clamp of the flange assembly.

In independent aspect D1, a filter bag assembly comprises: a flange assembly comprising an interior face and a tubesheet face, the flange assembly comprising a clean air outlet extending through the flange assembly; a cage comprising a first cage end attached to the flange assembly, the cage extending away from the interior face of the flange assembly over a cage length to a second cage end distal from the base, the cage defining a cage axis extending between the first cage end and the second cage end; and a filter bag comprising a tubular body formed of filter media configured to remove particulate matter from air passing through the filter media, the tubular body extending from a closed end to a bag opening along a bag axis coincident with a central axis of the tubular body, wherein the cage is contained within the tubular body of the filter bag, wherein a sealing cuff extends around a perimeter of the bag opening; wherein the flange assembly comprises a base and a clamp configured to attach to the base on the interior face of the flange assembly, wherein the clean air outlet is defined by a base aperture formed in the base and by a clamp aperture formed in the clamp, wherein the base comprises a bag seal surface surrounding the base aperture and the clamp comprises a clamp seal surface surrounding the clamp aperture, wherein the sealing cuff is located between the bag seal surface and that clamp seal surface when the clamp is attached to the base, and wherein the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

In aspect D2 according to aspect D1, the tubesheet seal surface defines a tubesheet seal plane and wherein the cage axis is generally normal to the tubesheet seal plane.

In aspect D3 according to any one of aspects D1 to D2, the second cage end defines a second cage end plane generally normal to the cage axis.

In aspect D4 according to any one of aspects D1 to D3, the cage comprises a plurality of struts attached to the base.

In aspect D5 according to aspect D4, the plurality of struts are attached to the base between the base aperture and the bag seal surface.

In aspect D6 according to aspect D4, the plurality of struts are attached to the base between the tubesheet face aperture and the tubesheet seal surface.

In aspect D7 according to any one of aspects D4 to D6, the plurality of struts attached to the base are aligned with the cage axis between the first cage end and the second cage end.

In aspect D8 according to any one of aspects D1 to D7, the base aperture and the clamp aperture are each elongated such that they each define a major axis and a minor axis oriented perpendicular to the major axis, wherein the major axis is greater than the minor axis, and wherein, optionally, wherein the major axis is greater than the minor axis by a factor of 2 or more, 3 or more, or 4 or more.

In aspect D9 according to aspect D8, the cage comprises a first strut attached to the base proximate a first end of the base aperture on the major axis and a second strut attached to the base proximate a second end of the base aperture on the major axis, wherein the first strut comprises a first strut length between the base and the second cage end that is greater than a second strut length between the base and the second cage end.

In aspect D10 according to any one of aspects D1 to D9, the distance between the bag seal surface and the tubesheet seal surface in a direction aligned with the cage axis changes continuously when moving around a perimeter of the base aperture.

In aspect D11 according to any one of aspects D1 to D10, the filter bag support assembly comprises a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect D12 according to aspect D11, when the clean air outlet is elongated such that the clean air outlet defines a maximum height along a major axis and a maximum width less than the maximum height along a minor axis transverse to the major axis, the guide aperture is located along the major axis.

In aspect D13 according to aspect D11 to D12, the guide aperture is formed in only one of the base and the clamp of the flange assembly.

In aspect D14 according to aspects D11 to D13, the guide aperture is formed in the clamp of the flange assembly.

In aspect D15 according to any one of aspects D1 to D14, for the filter bag, a reference bag length measured along the bag axis between a reference plane oriented perpendicular to the bag axis and the bag opening changes when moving around the perimeter of the bag opening, and wherein, optionally, the bag axis is aligned with the cage axis.

In independent aspect E1, a filter bag comprises a tubular body formed of filter media configured to remove particulate matter from air passing through the filter media, the tubular body extending from a closed end to a bag opening along a bag axis coincident with a central axis of the tubular body, wherein a sealing cuff extends around a perimeter of the bag opening, and wherein a bag opening perimeter length measured around the perimeter of the bag opening is greater than a body perimeter length measured in a reference plane oriented perpendicular to the bag axis at a location between the bag opening and the closed end.

In aspect E2 according to aspect E1, the perimeter of the bag opening defines a bag opening plane and the bag opening plane defines an angle with reference plane, wherein the angle defined between the bag opening plane and the reference plane is 15 degrees or more, 20 degrees or more, 25 degrees or more, 30 degrees or more, 35 degrees or more, 40 degrees or more, or 45 degrees or more, and, optionally, wherein the angle defined between the bag opening plane and the reference plane is 60 degrees or less, 55 degrees or less, 50 degrees or less, 45 degrees or less, 40 degrees or less, 35 degrees or less, 30 degrees or less, 25 degrees or less, or 20 degrees or less, and further optionally, wherein the angle defined between the bag opening plane and the reference plane is within a range of 15 degrees to 45 degrees, or, alternatively, 20 degrees to 40 degrees.

In aspect E3 according to any one of aspects D1 to D2, a reference bag length measured along the bag axis between a reference plane oriented perpendicular to the bag axis and the bag opening changes when moving around the perimeter of the bag opening.

In aspect E4 according to aspect E3, the reference bag length comprises a minimum reference bag length at a first location on the perimeter of the bag opening and a maximum reference bag length at a second location on the perimeter of the bag opening.

In aspect E5 according to aspect E4, a rate of change in the reference bag length between the first location and the second location is substantially linear.

In aspect E6 according to any one of aspects E4 to E5, a distance between the first location and the second location is equal when moving clockwise and counterclockwise along the perimeter of the bag opening from the first location to the second location.

In aspect E7 according to any one of aspects E3 to E6, the reference bag length changes continuously over at least a majority of the perimeter of the bag opening.

In aspect E8 according to any one of aspects E3 to E7, the reference bag length changes continuously over the entire perimeter of the bag opening.

In aspect E9 according to any one of aspects E1 to E8, the filter bag comprises a bag support connector attached to the body proximate the closed end of the body, the bag support located outside of an interior volume of the body.

In aspect E10 according to aspect E9, the bag support connector comprises an aperture configured to receive a hook.

In independent aspect F1, an air filter system comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag according to any one of aspects A1 to A10 or any one of aspects E1 to E10, wherein the filter bag is located in the dirty air chamber.

In independent aspect G1, an air filter system comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag assembly according to any one of aspects D1 to D15, wherein the filter bag assembly is located in the dirty air chamber.

In independent aspect H1, a method of removing particulate matter from dirty air using an air filter system according to any one of aspects F1 or G1 comprises delivering the dirty air to the dirty air chamber through the dirty air inlet and removing clean air from clean air chamber through the clean air outlet.

In independent aspect I1, a method of installing a filter bag on a filter bag support assembly to provide a filter bag assembly as recited in any one of aspects D1 to D15 comprises: positioning the filter bag such that the filter bag opening is larger than a cage of the filter bag support assembly; advancing the filter bag opening over the cage towards a base of the filter bag support assembly; advancing a clamp of a flange assembly of the filter bag support assembly over the filter bag, wherein a tubular body of the filter bag extends through a clamp aperture in the clamp; and attaching the clamp to the base, wherein a sealing cuff on the filter bag forms a seal around the clamp aperture and a base aperture in the base such that air passing into or out of the filter bag must pass through the base aperture or the filter media forming the filter bag.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the filter bags, filter bag support assemblies, filter bag assemblies, and filter systems, as well as methods of using and/or assembling the same, are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A filter bag comprising a tubular body formed of filter media configured to remove particulate matter from air passing through the filter media, the tubular body extending from a closed end to a bag opening along a bag axis coincident with a central axis of the tubular body, wherein a sealing cuff extends around a perimeter of the bag opening, and wherein a reference bag length measured along the bag axis between a reference plane oriented perpendicular to the bag axis and the bag opening changes when moving around the perimeter of the bag opening.

2. A filter bag according to claim 1, wherein the reference bag length comprises a minimum reference bag length at a first location on the perimeter of the bag opening and a maximum reference bag length at a second location on the perimeter of the bag opening.

3. A filter bag according to claim 2, wherein a rate of change in the reference bag length between the first location and the second location is substantially linear.

4. A filter bag according to claim 2, wherein a distance between the first location and the second location is equal when moving clockwise and counterclockwise along the perimeter of the bag opening from the first location to the second location.

5. A filter bag according to claim 2, wherein the perimeter of the bag opening defines a bag opening plane and the bag opening plane defines an angle with the reference plane, wherein the angle defined between the bag opening plane and the reference plane is 15 degrees or more.

6. A filter bag according to claim 1, wherein the reference bag length changes continuously over at least a majority of the perimeter of the bag opening.

7. A filter bag according to claim 1, wherein a bag opening perimeter length measured around the perimeter of the bag opening is greater than a body perimeter length measured in a reference plane oriented perpendicular to the bag axis at a location between the bag opening and the closed end.

8. A filter bag according to claim 1, wherein the filter bag comprises a bag support connector attached to the body proximate the closed end of the body, the bag support located outside of an interior volume of the body.

9. A filter bag assembly comprising:
a flange assembly comprising an interior face and a tubesheet face, the flange assembly comprising a clean air outlet extending through the flange assembly;
a cage comprising a first cage end attached to the flange assembly, the cage extending away from the interior face of the flange assembly over a cage length to a second cage end distal from the base, the cage defining a cage axis extending between the first cage end and the second cage end; and
a filter bag comprising a tubular body formed of filter media configured to remove particulate matter from air passing through the filter media, the tubular body extending from a closed end to a bag opening along a bag axis coincident with a central axis of the tubular body, wherein the cage is contained within the tubular body of the filter bag, wherein a sealing cuff extends around a perimeter of the bag opening;
wherein the flange assembly comprises a base and a clamp configured to attach to the base on the interior face of the flange assembly,
wherein the clean air outlet is defined by a base aperture formed in the base and by a clamp aperture formed in the clamp,
wherein the base comprises a bag seal surface surrounding the base aperture and the clamp comprises a clamp seal surface surrounding the clamp aperture, wherein the sealing cuff is located between the bag seal surface and that clamp seal surface when the clamp is attached to the base,
and wherein the base comprises a tubesheet face facing away from the second end of the cage, wherein the tubesheet face comprises a tubesheet face aperture defining a portion of the clean air outlet, and wherein tubesheet face comprises a tubesheet seal surface surrounding the tubesheet face aperture, wherein a distance between the bag seal surface and the tubesheet seal surface in a direction aligned with the cage axis changes when moving around a perimeter of the base aperture.

10. A filter bag assembly according to claim 9, wherein the tubesheet seal surface defines a tubesheet seal plane and wherein the cage axis is generally normal to the tubesheet seal plane.

11. A filter bag assembly according to claim 9, wherein the second cage end defines a second cage end plane generally normal to the cage axis.

12. A filter bag assembly according to claim 9, wherein the cage comprises a plurality of struts attached to the base.

13. A filter bag assembly according to claim 12, wherein the plurality of struts are attached to the base between the base aperture and the bag seal surface.

14. A filter bag assembly according to claim 12, wherein the plurality of struts are attached to the base between the tubesheet face aperture and the tubesheet seal surface.

15. A filter bag assembly according to claim 12, wherein the plurality of struts attached to the base are aligned with the cage axis between the first cage end and the second cage end.

16. A filter bag assembly according to claim 9, wherein the base aperture and the clamp aperture are each elongated such that they each define a major axis and a minor axis oriented perpendicular to the major axis, wherein the major axis is greater than the minor axis, and wherein, optionally, wherein the major axis is greater than the minor axis by a factor of 2 or more, 3 or more, or 4 or more.

17. A filter bag assembly according to claim 9, wherein the distance between the bag seal surface and the tubesheet seal surface in a direction aligned with the cage axis changes continuously when moving around a perimeter of the base aperture.

18. A filter bag assembly according to claim 9, the filter bag support assembly comprising a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

19. A filter bag assembly according to claim 9, wherein, for the filter bag, a reference bag length measured along the bag axis between a reference plane oriented perpendicular to the bag axis and the bag opening changes when moving around the perimeter of the bag opening, and wherein, optionally, the bag axis is aligned with the cage axis.

20. A method of installing a filter bag on a filter bag support assembly to provide a filter bag assembly as recited in claim 9, the method comprising:
   positioning the filter bag such that the filter bag opening is larger than a cage of the filter bag support assembly;
   advancing the filter bag opening over the cage towards a base of the filter bag support assembly;
   advancing a clamp of a flange assembly of the filter bag support assembly over the filter bag, wherein a tubular body of the filter bag extends through a clamp aperture in the clamp; and
   attaching the clamp to the base, wherein a sealing cuff on the filter bag forms a seal around the clamp aperture and a base aperture in the base such that air passing into or out of the filter bag must pass through the base aperture or the filter media forming the filter bag.

* * * * *